United States Patent [19]

Sliwa, Jr.

[11] Patent Number: 5,216,631
[45] Date of Patent: Jun. 1, 1993

[54] MICROVIBRATORY MEMORY DEVICE

[76] Inventor: John W. Sliwa, Jr., 601 Coleridge Ave., Palo Alto, Calif. 94301

[21] Appl. No.: 608,335

[22] Filed: Nov. 2, 1990

[51] Int. Cl.[5] .............................................. G11C 11/21
[52] U.S. Cl. .................................. 365/174; 365/118; 365/151
[58] Field of Search ............... 365/174, 177, 157, 151, 365/118, 126, 51, 52; 360/97.02

[56] References Cited

U.S. PATENT DOCUMENTS

| 3,921,154 | 11/1975 | Barley | 340/173 R |
|---|---|---|---|
| 4,101,965 | 7/1978 | Ingebrigtsen et al. | 364/821 |
| 4,159,539 | 6/1979 | Tournois et al. | 365/189 |
| 4,829,507 | 5/1989 | Kazan et al. | 365/174 |
| 4,831,614 | 5/1989 | Duerig et al. | 365/174 |
| 4,945,515 | 7/1990 | Ooumi et al. | 365/174 |
| 5,036,490 | 7/1991 | Kajimura et al. | 365/151 |

OTHER PUBLICATIONS

G. Binnig et al., "Tunneling Through a Controllable Vacuum Gap", Applied Physics Letters, 40(2), Jan. 15, 1982, pp. 178-180.
J. Schneir et al., "Tunneling Microscopy, Lithography, and Surface Diffusion on an Easily Prepared, Atomic Flat Gold Surface", Applied Physic 63(3), Feb. 1, 1988, pp. 717-721.

Primary Examiner—Eugene R. LaRoche
Assistant Examiner—Son Dinh

[57] ABSTRACT

A memory device whose media scanning is vibrationally (cyclic harmonic vibration) or inertially (one-time pulsed read/write) driven is provided, comprising a plurality of cantilevers (7, 7', 7''), attached at one end and capable of vibrating. On the opposite end of each cantilever is disposed an array of storage bits (26). Opposite the surface of each cantilever having such a bit array is a read/-write head (27) which is similar in nature to a scanning tunneling microscopy or atomic force microscopy scanning-tip. Electronic support circuitry is provided to implement the memory device of the invention. Such circuitry includes a microprocessor (67), a multiplexer/demultiplexer (70), a group of circuits (66) comprising power supplies, sensing circuits and digital-/analog and analog/digital conversion circuits,and switching means (65) to permit all of the previous functions to be properly addressed to/from the correct bit-/array(s) and mating subdevice(s).

100 Claims, 8 Drawing Sheets

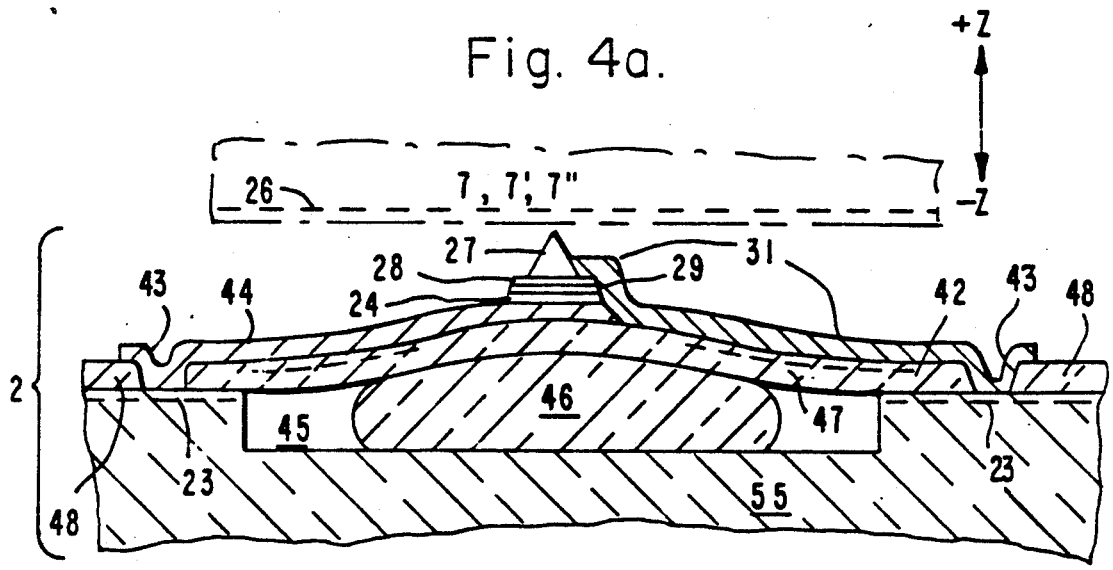
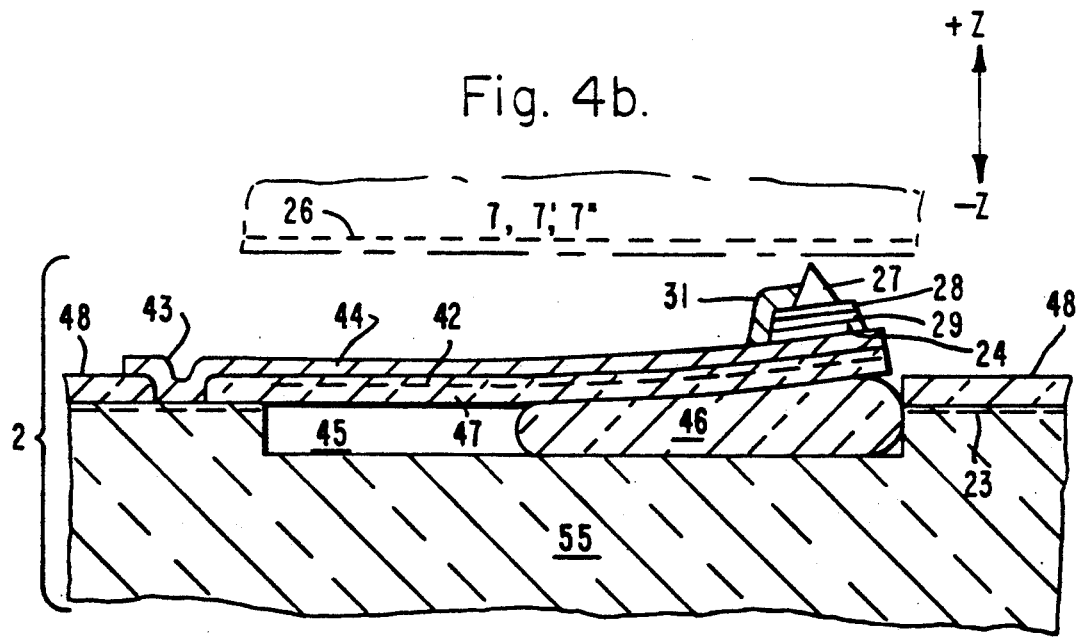

MICROVIBRATORY MEMORY DEVICE

TECHNICAL FIELD

The present invention relates generally to memory devices, and, more particularly, to memory devices employing semiconductor materials, but utilizing mechanical as well as electronic attributes of the material.

BACKGROUND ART

Two types of memory devices dominate in the information storage arena. These are rotating memory and solid state memory. Rotating memories, such as disk drives of the magnetic, magneto-optic and optical variety, store as much as one gigabyte of data but offer modest read/write times on the order of milliseconds. On the other hand, solid state memories such as DRAMs (dynamic random access memory), SRAMs (static RAM) and EEPROMs (electrically erasable programmable nonvolatile memory) offer much higher read/write speeds on the order of nanoseconds, yet are of far lower capacity, i.e. in the few megabit range. In terms of cost per bit, rotating memory is cheaper, but it is also much more mechanically unreliable.

Of great value would be a memory device combining the capacity of rotating memory with the speed, size, and reliability of solid state memory. With it, computers would take another quantum leap in performance and compactness as well as in reliability. Along this vein, ideas for optically storing huge amounts of data in three dimensional electro-optic crystals or optical holograms have been discussed; however, their execution is far from reality, and even if they are ever executed, it will be exceedingly difficult to shrink such devices to microchip-size because of the optical scanning required and the lower limit on bitsize established by the wavelength of the laser used.

DISCLOSURE OF INVENTION

In accordance with the invention, a memory device is provided, having extremely compact size which offers the user massive disk-like capacity, low cost per bit, read/write speeds far closer to those of solid state memories, inherent mechanical reliability, non-volatility and massproducability employing existing semiconductor fabrication processes.

The key features of the device are its lack of rolling or sliding parts, its architecture which distributes and-/or duplicates data among an extremely large set of independently operating subdevices, its ability to accommodate both volatile as well as nonvolatile bit storage, its monolithic design, its use of semiconductor-like processes for its manufacture, and its size, which is about the same as that of a large DRAM.

In essence, the techniques of micromachining are employed to create an areal array of microcantilevers. The areal array would consist of a grid covering the large flat face of such a device on whose intersections are situated the individual microcantilevers. Such an areal array might consist, for example, of an array of 1000×1000 microcantilevers (1 million total microcantilevers) covering a 1 cm×1 cm chip face.

Each cantilever has disposed on its surface an array of storage bits called a bit array. Opposite the bit array surface region of each cantilever is a read/write head which is similar in nature to a scanning tunneling microscopy or atomic force microscopy scanning-tip. Each bitarray is translated relative to its adjacent read/write head in a sweeping motion caused by the oscillatory vibration of its respective cantilever. The cantilevers are given their oscillatory motions in one of several possible ways, including driving by a coupled piezoelectric or electrostrictive resonator, by Coulomb forces created across capacitively-coupled electrodes (one of which resides on each moving cantilever), by forces created by driven differential thermal expansion of the cantilevers which causes the cantilever to bend like bimetals, or by the use of magnetic fields which either interact with electrodes or predisposed magnetic materials on the cantilevers to create controllable attractive/repulsive forces. The cantilevers are either driven in a state of continued harmonic excitation or are alternatively pulsed non-continuously to achieve at least one vibration cycle or to be driven inertially to a desired state of deflection.

Choices exist for placing either the bit-array(s) or the read/write head on the moving cantilever with its counterpart being disposed on the remaining opposite surface. Further choices exist involving the cantilever shape and direction of driving such that both linear and two dimensional bit arrays can be utilized and physically addressed.

The fabrication of the vibrating cantilevers as well as of the read/write heads and their associated electronics all employ existing tools and processes common to the semiconductor and solid-state sensor industries. The read/write head electronics employs circuitry like that used in the practice of STM (scanning tunneling microscopy) and AFM (atomic force microscopy), albeit shrunken to extremely small size. This is necessary in order to obtain the shortest interconnections, fastest speed, and lowest possible power for circuitry such as the preamplifiers.

The result is a mass-producible memory device which offers the unique combination of advantages of extreme compactness, no wearout, low power, massive redundancy, graceful failure, storage cell or bit sizes scalable down to the atomic level, the ability to utilize a variety of mechanical scanning speeds (both continuous and pulsed) and areal bit densities simultaneously in separate subdevices, extreme toughness, the ability to achieve extraordinary read/write data flow rates by multiplexing bitstreams to/from multiple subdevices, the ability to operate at very low temperatures which is an advantage because of the greater speed of the read/-write electronics and the minimization of thermal noise, and the opportunity to utilize such low temperatures to maintain a written bit in a physical state which is not stable at room temperature.

In any memory device, one wants to pack as many bits in a small area as possible. This means one wants to utilize areal arrays of densely packed bits or cells. If the areal arrays are to be physically addressed, one requires relative areal scanning motion of the bit array relative to the read/write head which is dedicated to that bit array.

In STM, one controls the Z-axis separation of the tip and the sample (the bit array herein) to a few Ångstrom constant dimension by maintaining the tip-to-sample tunneling current constant during a scan. This Z-axis gap control is achieved by moving the tip relative to the sample in a precisely controlled fashion using piezoactuators. In AFM, one controls the Z-axis separation of the tip and sample by maintaining a constant deflection of the tip-support as sensed by optical interferometry or capacitive coupling with corrections also being made by piezoactuators.

In the memory device described herein, it is desired to minimize the amount of such Z-axis adjustment during the scanning cycle, and furthermore, it is desired to make such adjustment as reproducible and predictable as possible. In this manner, the simplest and lowest-power electronics and Z-axis actuation means possible are used and one may optionally share each actuation electronic circuit among several subdevices. With the Z-axis tip-to-array gap adjustment at each sub-device, it is possible to correct for scanning methods which do not necessarily move the array relative to the tip such that the macroscopic separation gap remains perfectly constant; i.e., non-equidistant relative motions. This permits the use of vibrating cantilevers which do not swing at a fixed distance from the tip due to elastic deformations on whose end regions are disposed the bit arrays. A key advantage gained is that a cantilevered column can be made to oscillate in either a linear fashion in one dimension at a time or in an orbital or Lissajous areal pattern in two dimensions simultaneously. Such columns with bit arrays on their ends (or tops) can be close-packed like trees in a forest and can be driven simultaneously by, for example, a PZT (lead zirconate titanate) slab on which the columns are mounted, as the trees in a forest would all deflect in a wind gust.

By making such columns out of anisotropically etched single crystal silicon, for example, and driving them in a vacuum, it is possible to obtain low-loss multicycle motion which is very reproducible. In such an etching process, the long dimension or height of the columns is being deeply etched into the face of a slab of material such as silicon. The face of the slab then contains the column end regions which become the bit arrays.

The set of possible orbital paths associated with two dimensional motion of the cantilever tips is actually not quite perfectly planar and is very slightly spherical to first approximation. It is the reproducability of the elasticity and the lack of grain boundaries in single crystal silicon and the perfection of semiconductor methods in etching such arrays of cantilevers that results in the near-identical physical and vibratory characteristics of each cantilever.

The slight sphericity of the bit array motion and resulting potential gap variation is negated by the tip actuators and that is made easier because the Z-axis gap corrections are harmonic and are all of nearly identical amplitude and phase. By employing silicon as the cantilever material, good thermal conductivity is gained as well as a perfectly reproducible low expansion coefficient, thus minimizing and equalizing Z-axis gap corrections to accommodate thermally-induced dimensional changes. Because the columns can oscillate in unison, they can be packed very closely such that the overall real-estate is well-utilized.

In the embodiments described herein, the oscillating or deflecting cantilever arrays or plate arrays have disposed on them the bit arrays. This is because the tips, disposed on an opposing surface, require extensive interconnection and circuitry as well as excellent thermal sinking. Furthermore, to obtain the highest performance, it is desired that the tip circuitry and interconnections be as compact as possible. Placing individual tips on the moving cantilevers would entail the use of long interconnects with high capacitance and inductance and would also expose active electronics to cyclic stress and poor thermal sinking as well as the rigors of processing associated with column fabrication. Thus, the surface supporting the tips and their respective actuation and electronics is most easily fabricated directly out of silicon using the conventional planar process techniques. In this manner, the tips and all of their associated electronics and interconnections consist of a chip-like device made with the same processes as microchips are made. This strategy permits the use of non-semiconductor material for the columns such as in an application to be described wherein optical erasure means requires the columns to be optically transparent.

While an embodiment wherein the bit arrays are disposed on a continuous large-area plate and that plate is oscillated relative to several mating tips disposed on an adjacent flat surface will be discussed, there are distinct advantages of employing a sea of small-area cantilevers instead. A single cantilever can be designed to have a resonant oscillation frequency that is on the order of a few Hertz to tens or even hundreds of kiloHertz. At the same time, relatively large displacements of the cantilevers can be achieved, especially in the resonant mode, with tolerable gap corrections.

Given that it is desirable to achieve ultra-small bits for maximum bit density, say, 10 Å diameter bits on 20 Å centers arranged in a square grid bit array, a scanning oscillation frequency in the kiloHertz range combined with displacements of the bit array on the order of a micrometer results in read/write data flow rates of a few megaHertz to/from one such bit array. Cantilevers can be set in resonant motion and that motion can be maintained with minimal ongoing excitation pulses.

When using an oscillating plate to support many bit arrays, one is presented with certain tradeoffs which can be avoided in the cantilever approach. Firstly, for a swinging plate to be internally rigid, it must have substantial depth so as not to introduce unwanted plate-mode vibrations which would complicate Z-axis separation control. This substantial depth results in substantial mass which must be moved at high frequency through substantial displacements. This can result in more power being consumed than in the cantilever approach for the same memory implementation. One may consider a hollowing of the plate to reduce its mass to help in this situation. The internal flexing of swinging plates can be totally avoided by not swinging or sliding the plate but by having the rigidly attached plate distort in shearing motion. A plate not in swinging motion but in shearing motion is far stiffer than a cantilever in bending motion. A plate in shear motion across its thickness of thickness equal to the cantilever height has far higher resonant frequency than the cantilever. The result is small scan distances at high frequency.

In order to obtain large cantilever-size motions with plates, it is best to suspend the plate on its edges with springs which cause the plate to oscillate in its own plane. This is drastically different than gripping a plate by its back surface and causing it to vibrate in shear. In the latter case, large oscillations require a very thick plate, whereas in the former case, wherein the plate simply swings but does not distort in shear, large amplitudes can easily be had by using "soft" low-stiffness micromachined springs of great depth, thus of large Z-axis rigidity.

In the cantilever approach, one can isolate groups of tips and cantilevers using stationary (relative to the tips) continuous isolation stiffener walls which directly attach to the tip-supporting cover layer and which are formed in the cantilever layer simultaneously with the cantilevers, thus assuring that the entire structure has very high Z-axis local stiffness and no unwanted structural vibrations. In a plate approach, the large plates obstruct the possibility of having frequent structural connections between the cantilever (plate) layer and tip layer, thereby inviting unwanted device distortions and the possibility of chain-reaction failures of multiple tips.

For the purposes of this discussion, a plate has the bit arrays disposed on one of its large faces adjacent to the tips and either shear deformation takes place across the smallest (thickness or depth) dimension or alternatively swinging or sliding movement of the plate takes place mainly in its own plane and the plate itself undergoes no distortion, whereas a cantilever has the bit array disposed on its end (or edge in the case of a wide but thin cantilever) and the cantilever deforms by bending in at least one direction of low stiffness, much as a tree bends with the wind. In the extreme cantilever case, a cantilevered beam becomes a plate deforming in shear if its lateral dimensions (looking at the bit array on the end) are large enough that bending is replaced by shear as the predominant deformation mode.

The advantage of a cantilevers-in-a-cell approach is that one obtains maximum stiffness of the entire structure where it is needed while also obtaining large swept bit areas and minimal power consumption as well as a continuous tradeoff of vibratory amplitude with vibratory frequency by simple selection of the cantilever length to cross-sectional dimension ratio. By varying the cantilever diameter (beam cross-section dimensions and shape) on the lithographic etching mask, one may simultaneously obtain a variety of devices having different resonant properties. Thus, it is possible to have cantilevers selectively excited or excited to different harmonics under one set of driving forces.

In the resonant oscillation mode wherein one or more vibratory harmonics are excited, a sea of cantilevers vibrating can provide a strong feedback signal to the driving PZT and its electronics, thus making possible accurate control of the maximum amplitude without directly damping cantilever motion via disposing of viscous agent materials. Damping will increase power and reduce the uniformity of the oscillations from location to location if a solid damping material is employed in a continuous oscillation scheme. The use of a gaseous damping medium such as helium which can help isothermalize the structure with minimal power increase is anticipated.

In the mode wherein the driving PZT resonator is not used to cyclically oscillate cantilevers or plates continuously, but rather is employed to drive a cantilever or plate from its relaxed position to a deflected position where data is to be written or read immediately upon arrival, then viscous damping of the plates or cantilevers can be very attractive. In such an application, the driving PZT determines the scan speed in combination with inertial forces and viscosity. Quite literally, the device (with tip) is moved quickly and the cantilever (plate) remains still due to its inertia. This scheme permits read/write times faster than those attainable in the continuous vibration mode wherein, worst case, one may have to wait almost a whole vibratory cycle for the bits of interest. Such an inertial application would most likely utilize damping and low stiffness cantilevers.

An implementation method for the tip/microactuator means may take the form of four preferred general approaches, which will be described below; each of the approaches has its own advantages. For any such approach, the challenge is to provide a coarse macroscopic gap adjustment which gets the tip/fine actuator within reach of the bit array so that the fine actuator means can then provide the operating gap control.

It is to be understood that coarse motions, as described herein, may be employed for one or more of the following purposes: (a) to achieve the correct initial tip-bit gap by negating the typically large manufacturing tolerances, usually measured in micrometers or fractions of a micrometer; (b) to provide the capability for moving the tip to a safe "parked" position when the device is not functioning; and (c) to negate the relatively large tip-bit gap variations due to the swinging action of the bit-bearing member which typically amount to a fraction of a micrometer for a cantilever. In all cases, the tip-bit gap corrections required to maintain the few Ångstroms tip-bit operational gap as individual bits pass by must be done at high frequency, typically in the MHz range, and the motion required is infinitesimal (e.g., a few Å). This fine motion itself either requires a piezo stack or a tip-supporting diaphragm or cantilever without a piezo stack optimized for rapid response, as well as for large operational range so that coarse corrections may also be provided.

Without a coarse adjustment, the manufacturing tolerances required to put the device together would be much more stringent, as the gap would have to be within the fine adjustment's range as-assembled. In such a circumstance, there is also less margin against physical assembly damage. The reason it is difficult to provide both coarse and fine adjustments is that extreme rigidity of the entire structure is desired during operation so as to avoid ambient vibrations or driving excitations from coupling to structural resonant modes, thereby introducing signal noise. It is desired that the cantilever have a driven oscillation capability in most of the embodiments to be discussed. In an STM or AFM, there is plenty of room to use bulky and rigid piezoactuator tripod-like tip and sample support structures which have the dual properties of not having low frequency vibration modes, which could be excited by the ambient or the scanning means itself, and having the large manipulation distances possible with large stacked PZT actuators and/or bending tubular PZT actuators. Those instruments also often utilize micrometer screws and precision levers for coarse tip-sample adjustment.

In implementing the memory device of this invention, which has hundreds and perhaps many thousands of subdevices, each of which requires similar but not perfectly equal adjustments, it is clear that manufacturability and the avoidance of low frequency resonant bending modes require automatic coarse adjustment and rigidization of the coarse adjustment means after use. Coarse motions on the order of several hundred to a few thousand Angstroms require monolithic (non-stacked) piezoactuators of fairly large and unwieldy size if their bulk distortion is to be utilized in the typical manner to lift a tip or tip plus fine actuator assembly. It is difficult to get such large deflections at reasonable voltages and unit strains out of extremely thin piezomaterials as needed herein. However, non-monolithic stacked piezo structures having additional internal electrodes can provide such motions. Alternatively, a small and simple non-piezo bending-beam cantilever on which the same tip or tip/actuator rides can flex such distances, but suffers from a low resonant frequency and is therefore susceptible to spurious vibrations and noise introduction, so a way to rigidize and lock it in its coarseadjusted position so as to vastly increase its resonant frequency would be required.

Finally, electronic support circuitry is provided to implement the memory device of the invention. Such circuitry includes a microprocessor, a multiplexer/demultiplexer, a group of circuits comprising power supplies, sensing circuits and digital/analog and analog/digital conversion circuits,and switching means to permit all of the previous functions to be properly addressed to/from the correct bit/array(s) and mating subdevice(s).

BRIEF DESCRIPTION OF THE DRAWINGS

FIG. 3' is an enlarged portion of FIG. 3, showing the detail of the tip and microactuation means;

- FIG. 4a shows in cross-section a tip/fine actuator and beam supporting means for providing coarse adjustment which generates the coarse motion by a beam-buckling phenomenon;

FIG. 4b shows in similar section a tip/fine actuator and beam supporting means for providing coarse adjustment, similar in nature to that of FIG. 4a, except that the movable beam is supported mainly on one end rather than on both ends and coarse motion is primarily caused by cantilever beam-bending and not beam-buckling, as in FIG. 4a;

BEST MODES FOR CARRYING OUT THE INVENTION

Before proceeding to a discussion of the Figures, a review of the first six references (Refs. 1–6), which deal with STM and AFM, is recommended. These references, listed at the end of the specification, will provide an understanding of the existing technology and experience in employing piezoactuated macroscopic sensing tips for microscopy and how this invention employs a microscopic sensing tip of different design in the novel manner described.

There are additional references, also cited at the end of the specification. These additional references are provided mainly to illustrate the fact that this memory device is generically capable of utilizing a wide selection of bit media optimized for each and every application, unlike the case with present-day memory devices, each type of which is associated with a single medium. In no way can these references, in any reasonable combination, be construed as rendering the invention herein obvious. It is the structure and fabrication of these memory devices which is considered to be novel. The memory devices of the invention are able to implement many media technologies. The choice between constant vibration and single-pulse addressing is also considered to be novel, as is cantilevers on-end and plates, all discussed in greater detail below.

Reference is now to the drawings wherein like numerals refer to like elements throughout. It will be appreciated that the drawings are not to scale, and that some elements are schematically depicted for simplicity in representation.

Figure 1:
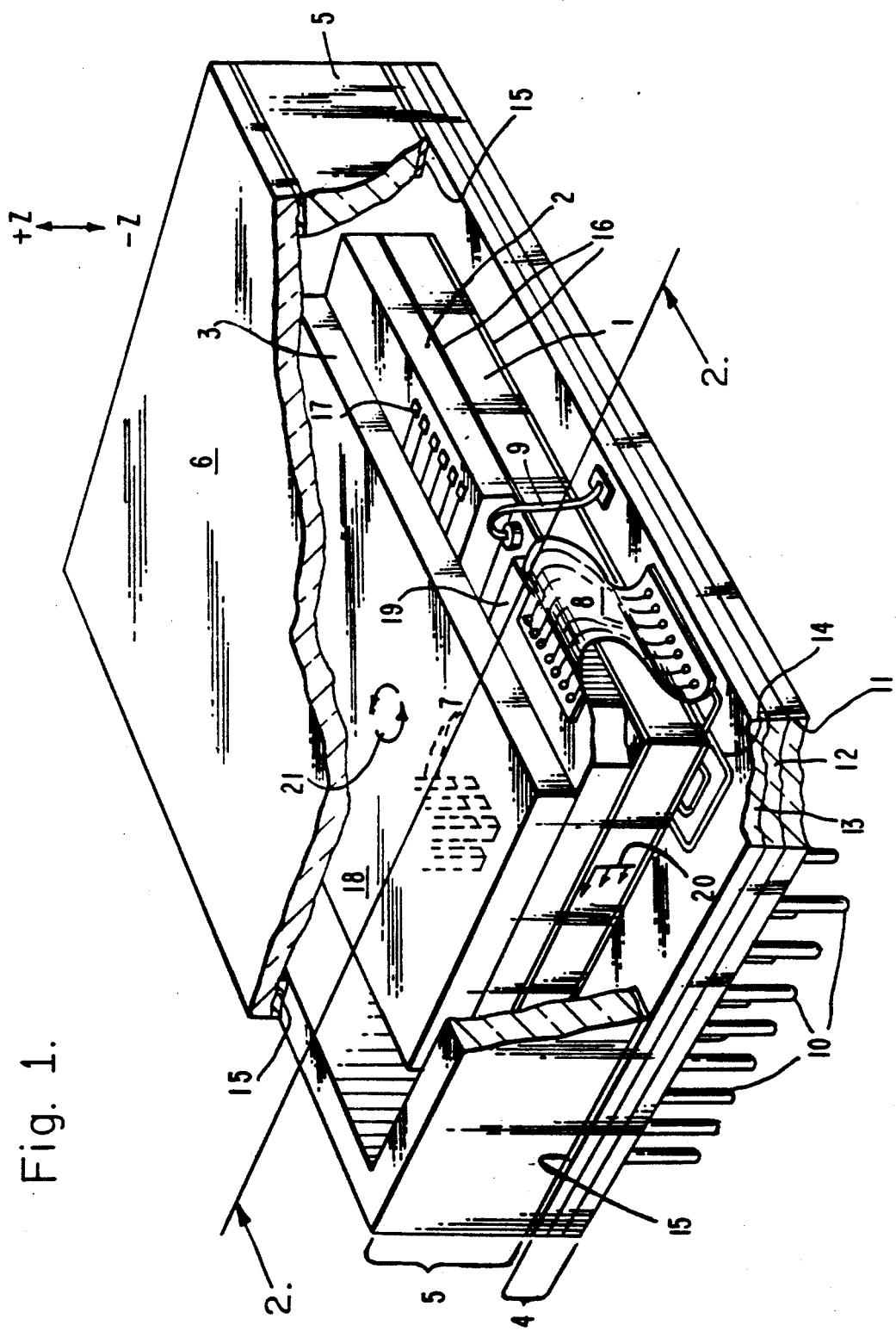
FIG. 1 is an isometric view of the microvibratory memory device and its key components.

Referring now to FIG. 1, an example of a packaged microvibratory memory device of the invention is shown. PZT resonator 1 with top and bottom electrodes 16 is shown attached to multilayer ceramic package base 4. The outer wall 5 of the package is made of ceramic or metal and is bonded to the base 4 using a solder or glass sealing ring 15. The cover 6 of the package is also attached with a sealing ring 15.

Mounted upon the PZT resonator 1 are two additional layers of the device: a tip/electronics layer 2 and on top of that a cantilever layer 3. Shown is a flexible circuit 8 which connects the electronic circuitry of the layer 2 and layer 3 (connection not shown) to the ceramic mating circuit traces on package base 4. It will be noted that base 4 may comprise multiple co-fired layers 11, 12, and 13 and have an array of external pluggable pins 10, as is common with good quality packages. A single wire bond 9 is also shown whose purpose is to connect a driving voltage to the top electrode of the PZT resonator. The flex circuit connections on the ceramic are connected to base traces 14 which in turn are routed to pins 10 which serve signal and power functions. In phantom within layer 3 are shown several vertically oriented cantilevers 7 whose fixed ends are closest to top surface 18 of cantilever layer 3 and whose vibrating free ends are in extremely close proximity to the surface 19 of tip/electronics layer 2 on which the read/write tips (not shown) reside.

The device is activated for reading or writing by setting the microcantilevers 7 into vibratory motion by providing a time-variable voltage across the piezoelectric electrodes 16. Lead zirconate titanate (PZT) is suitably employed as the piezoelectric material. Examples of other materials useful in the practice of the invention include α-quartz, lithium sulfate monohydrate, lead titanate, lead meta-niobate, polyvinylidene difluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, and ammonium dihydrogen phosphate. Either monolithic or composite piezoelectric material may be used.

The PZT is prepoled so that the application of such an electrical field across electrodes 16 causes shear deformations of the type 20 of the PZT resonator 1 as is widely practiced with shear transducers. This shearing motion 20 can be made harmonic by applying, for example, a sinusoidally varying voltage. The fact that the resonator 1 is rigidly attached to the relatively massive base 4 causes the maximum net deformation to take place at the top surface of the resonator 1. Since the two layers 2 and 3 are rigidly bonded to that top surface of the resonator 1, the two layers, which are also rigidly attached to each other, are set in harmonic motion. The cantilevers 7, which are attached on only one end to layer 3, are therefore set in motion by inertial forces created by their moving foundation.

It is to be noted that layers 2 and 3 would typically be considerably less massive than the package comprising elements 4, 5, and 6 together. In this manner, the active device (layers 2 and 3) is accelerated through maximum displacements relative to an inertial reference system, and little energy is consumed in vibrating portions 4, 5, and 6.

While the preceding description has been directed to employing a piezoelectric material as the resonator 1, it will be appreciated that other means of providing controlled structural distortions may alternatively be used. For example, ferroelectric and electrostrictive materials may alternatively be used. Examples include molybdates having the gadolinium-molybdate beta (prime) structure and materials having the formula $ABO_3$, where A and B are cations.

In addition to setting cantilevers in continuous motion, the resonator may be employed to drive layers 2 and 3 in a single shaped-pulse event rapidly enough that inertia leaves the cantilever ends (the bit arrays) stationary. This results in the tips rapidly being able to be moved to under any desired bit on the bit array.

For simplicity, a single layer 1 of resonator material is shown. For achieving orbital or elliptical driven motions 21, one may, for example, arrange for layer 1 to be split into two sublayers with an additional electrode in the middle and each sublayer poled such that the application of the two separate driving voltages each shears its subresonator in a direction 90° to that of its neighboring subresonator.

In this manner, any planar driving function of either continuous wave or pulsed wave variety can be employed to drive the cantilevers either steadily in resonance or off resonance or alternatively the cantilevers may be repeatedly or singly pulsed and allowed to have their free vibrations decay to a chosen amplitude. For purposes of testing and redundancy during manufacturing, test pads 17 are provided for electrically exercising the tip circuits and possibly for electrical programming of redundant tip circuitry. Finally, cross-section 2—2 through the heart of the device is indicated by the arrows 2—2 in FIG. 1.

Preferably, silicon is employed as the cantilever material, since processing of silicon (e.g., etching out cantilevers 7 from a support frame 3) utilizes well-known and characterized procedures. However, it will be appreciated that other materials may be employed as cantilevers; examples of such materials include glasses, ceramics, oxides, semiconductors, and graphite. Some examples include very fine grain aluminum-nitride ceramic, which is highly thermally conductive and has low expansion, thin film diamond, oxidized silicon wherein a silicon cantilever is partially converted to $SiO_2$ conformally, and borosilicate glasses as used in mask-making which can transmit UV optical radiation for the erasure of charged bits. Other examples include the materials indicated in connection with the resonator 1.

Electrically-deformable materials used to form the swinging cantilevers or plates provide an additional degree of design freedom in that tip-gap correction needs can be implemented, at least in part, by electrically extending or contracting such swinging members in combination with moving the tip itself. Herein, the focus will be primarily on implementations wherein the tip motion provides all such gap corrections.

Figure 2:
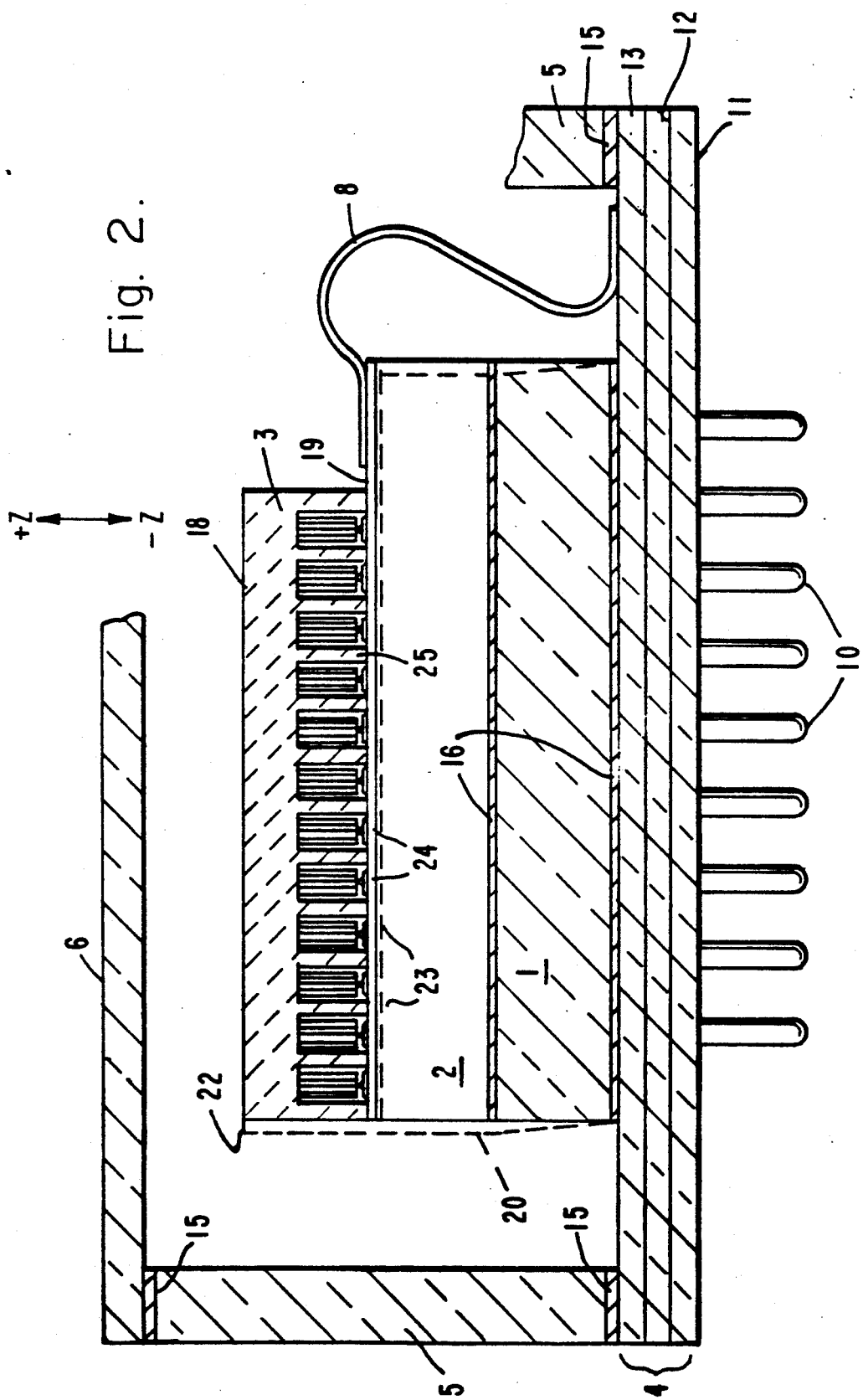
FIG. 2 is a cross-sectional view taken along the line 2—2 of FIG. 1 of a preferred embodiment of the vibratory memory device.

Reference is now made to FIG. 2, which is a cross-sectional view taken along 2—2 of FIG. 1. Here, the phantom cantilevers 7 of FIG. 1 can be seen to consist of individual hermetically isolated subsets of twenty-five cantilevers, each arranged in a five by five array. The viewer can see only the nearest five of each subset in this section. Each group of twenty-five is hermetically isolated from its neighboring subsets of twenty-five by a structural web item 25. It is these web stiffeners which insure high Z-axis stiffness on a local basis. Given such stiffeners, there is not a device lateral-size limit caused by the onset of unwanted plate-mode vibrations of layer 3 relative to layer 2.

In phantom is shown the sheared PZT resonator (or actuator) position 20 as well as the resulting laterally displaced assemblage 22 consisting of layers 2 and 3. Individual read/write tips sit below each of the twenty-five cantilevers on their own microactuation pads 24 (not all shown in FIG. 2). It is these microactuation pads which move the tips in and out to negate the time variation of the tip-to-cantilever gap distances to maintain correct read/write functionality which is very separation-dependent for the bit-media to be described herein.

Also shown as phantom layer 23 are the interconnections and integrated devices which are necessary to operate and address the tips. These are fabricated, in one embodiment, on the surface of the layer 2 which, in this approach, looks much like an integrated circuit with added piezo pads on which are disposed tips. Each twenty-five individual cantilevers move in unison within their respective isolated chambers.

It will be recognized that the natural frequency of the cantilevers may be low enough that some unwanted excitation of the cantilevers takes place due to the environment rather than due to resonator 1. Several methods of dealing with this are as follows. Firstly, one may insert vibration isolation layers into the structure, with the cost being that some amount of the excitation power provided by resonator 1 is dissipated as heat in such layers. As an example, the PZT could sit on a rubber or foam pad within the package. Alternatively, if the structure consisting of layers 1, 2, and 3 as-bonded were immersed and suspended in a vibration isolation material such as a gel or silicone which filled the package cavity, then the gel would isolate the device from the outside world. In this case, the power being put into the PZT actuator 1 would cause the entire structure comprising elements 1, 2, and 3 to vibrate in its plane, causing the cantilevers to vibrate. In this case, some power is wasted, because not all of the PZT deformation results in ¾ kinetic energy. The assemblage comprising elements 1, 2, and 3 is therein a free-standing, unattached resonator 1 with attached inertial mass 2, 3. Finally, external vibrations may be actively damped by the PZT resonator 1, especially if the resonator sits on a vibration isolation layer having slow acoustic velocity, and such unwanted vibrations are sensed before they propagate through the isolation layer and are actively damped by resonator 1, using a damping driving function superimposed on top of the driving function.

One may choose to utilize one or more cantilever devices to read a spatial reference pattern of positional data written on its bit-array, thus providing a signal which is a function of unwanted displacement and acceleration to the corrective means which may, as described, consist of corrective damping or cancellation resonator motions. The same reference pattern may aid in tip position determination on all cantilevers, as is done with tracks and sectors on magnetic disk drives.

The above discussion was to unwanted vibrations of the cantilevers in their normal bending direction. Although the axial stiffness of each cantilever is extremely high, minor Z-axis longitudinal-mode vibrations of the cantilevers can be corrected by the tip microactuators, as can the thermal axial expansion of the cantilevers.

For the sake of limiting the maximum possible cantilever displacements experienced either by normal excitation or by extreme shock, one may consider employing damping materials directly around the individual cantilevers. Furthermore, such materials could help isothermalize the structure, as well as provide short "ringdown" or settling times. However, as the bit-size decreases, one will encounter increasing problems with such materials transporting or introducing foreign material or dirt particulates to the tip region which is known to cause signal-to-noise problems if not outright failure of STM and AFM devices. In the case of a liquid damping material, one would need to have a large mismatch in density between the cantilever and the liquid or it would not deflect with acceleration forces. Furthermore, a liquid would severely limit the upper vibrational frequency and create convective and turbulent forces. This is acceptable so long as continuous rapid oscillation is not required. In such cases, data would typically be read/written with a single shaped-pulse displacement event. One could add extra mass to the cantilevers via CVD tungsten deposition to further enhance this type of inertial addressing in a viscous medium.

Another reasonable damping material consists of an elastomeric material such as RTV which may not necessarily fill the entire depth or area of the cantilevers, neighboring swinging space. An advantage of such an elastomer is that the resonant frequency can be increased even though more damping exists and that it is easier to guarantee that the cantilevers all swing in unison.

Included within the scope of the invention are approaches wherein all of the cantilevers (e.g., 25 herein) within each hermetically sealed subchamber have flexible spacers, for example of elastomer or very thin silicon nitride, bridging the gaps between them to not only maintain spacing but also to provide damping. Obviously, the bit size must be big enough so as not to have its readability/-writability affected adversely by any outgassing of such spacers.

Finally, a gaseous cantilever dampant may be employed, for example, helium, which will help to isothermalize the structure. This can be most effective when each and every cantilever is surrounded by or adjacent to walls 25.

Figure 3:
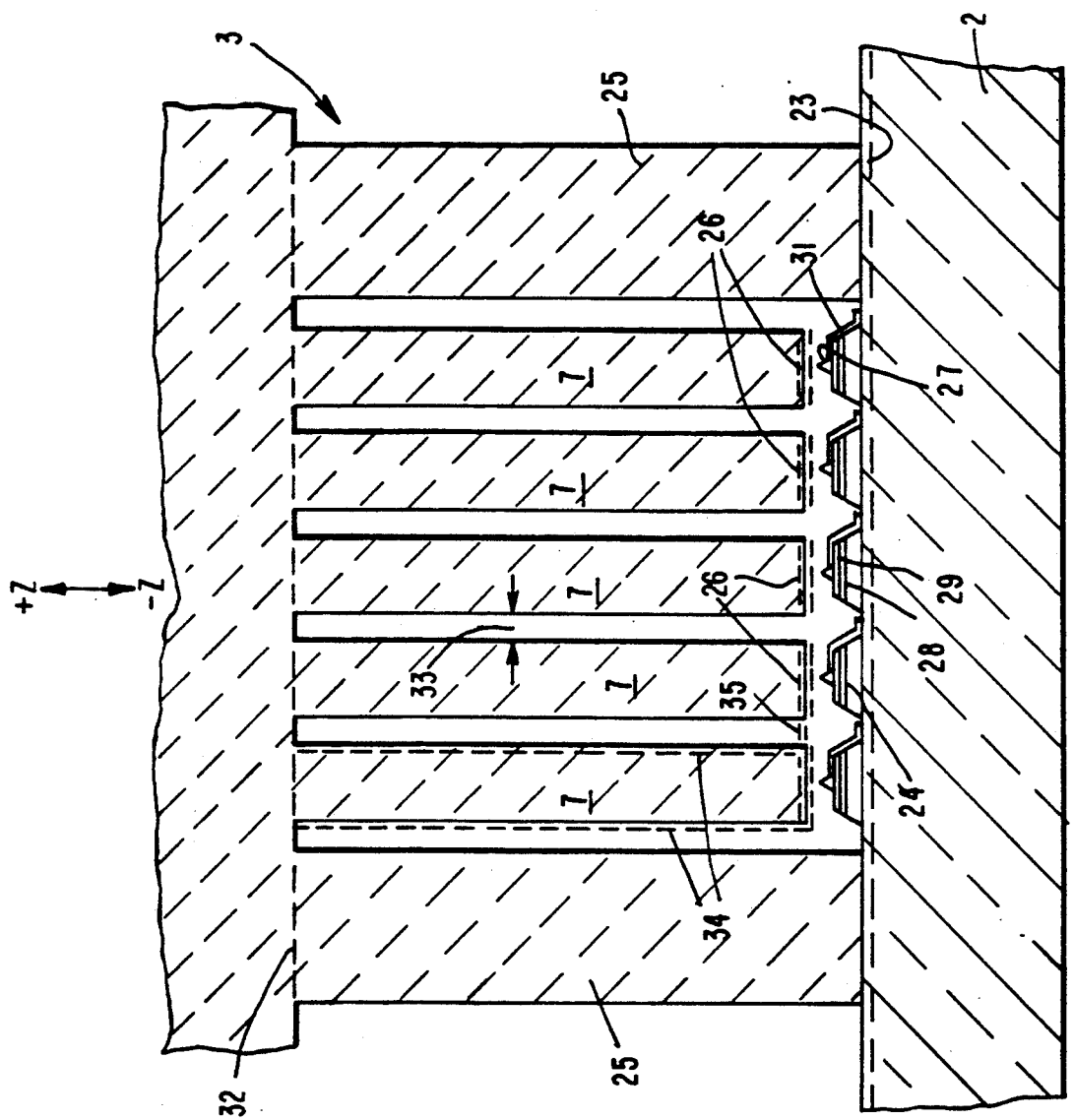
FIG. 3 is a magnified portion of FIG. 2, showing the detail of the individual cantilevers, their surface memory bits, the tips and their associated electronics and microactuation means.
Figure 3:
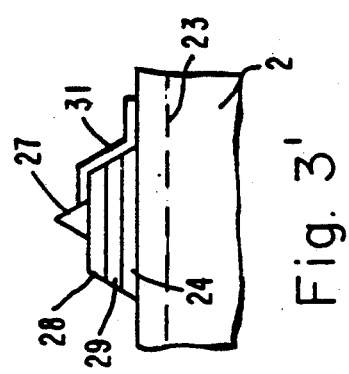

Reference is now made to FIG. 3, which is an enlargement of a portion of FIG. 2. Here, the five nearest cantilevers 7 can be seen. In this view, tips 27, one per cantilever, are shown fabricated on a stack which consists of microactuators 24 having a top electrode 29 covered by a dielectric 28 on which the tip 27 sits. An enlarged view of one tip/microactuator assembly is shown in FIG. 3'.

The microactuator is fabricated out of piezoelectric or electrostrictive material which is most conveniently deposited in film form by sputtering, spinning, or lamination followed by lithographic definition and plasma reactive-ion etching or dicing. Suitable materials include PZT as deposited by sputtering, lamination, or the sol-gel method and PVDF (polyvinylidene difluoride) as deposited by film lamination or spin-casting and curing.

Each microactuator 24 has an independent top actuation electrode 29 and a possibly common bottom electrode (not shown) in order to be able to provide a driving voltage across its thickness in order to raise and lower the respective tips 27. Shown is a dielectric insulating layer 28 under each tip 27 which maintains the isolation of the tip bit-sensing/writing signals from the tip movement driving voltages. Some circuit design approaches will allow the elimination of this insulator.

Interconnections 31 are shown connecting each independent tip 27 to its respective independent local circuitry 23. Layer 23 basically looks like an integrated circuit surface but has on top of it isolated by the necessary insulators the microactuators/tips which are connected down to the circuitry 23.

One cantilever 7 is shown in a partially deflected position 34 as all cantilevers would be of a given design. This deflection, as previously discussed, will generally be mapping in an areal manner. Also shown are bit arrays 26 situated on the cantilever faces closest to the tips 27.

Anisotropic wet etching means such as EDP (ethyl diamine pyrocatechol) solutions or KOH solutions could be employed on (111) silicon or alternatively on (100) silicon with more restrictions in their shape to form the cantilevers or alternatively reactive-ion etching (RIE), electroncyclotron RIE or microwave-assisted plasma etching may be used with conventional sensor or IC masking techniques to etch the cantilevers in (111) or (100) silicon. Indicated in the FIG. 3 is an interface 32 at which the etch-front of the grooves 33 stops. In selective anisotropic wet-etching, such etch-stopping can be achieved by using epitaxial silicon wherein one layer of the silicon has a higher boron content than the other layer. Interface 32 is such a boron concentration discontinuity in the Figure. The cantilevers are formed by etching into the silicon surface along the Z-axis in the +Z direction.

The cantilevers 7 employed in the practice of the invention may be of any photodefinable shape, and most typically would be rectangular, square, round, elliptical, or polygonal in cross-sectional shape. They may also be hollow and tubular, such as with a hollow tubular cylinder. The advantage of hollow tubes is their higher frequency due to their lower mass but not much lower stiffness. The cantilevers 7 may also have long narrow cross-sectional shapes and vibrate in primarily one direction as opposed to vibrating in a pseudoplanar sweeping motion. The cantilevers 7 may also be arranged to be bridged by a thin web of material 35 shown in phantom in FIG. 3. This material can aid in maintaining spacing and could also hold additional bit array media, possibly read with additional tips as well as provide the previously discussed damping function. Within the scope of this invention is the approach wherein such a web 35 is an appreciable portion of the bit-media substrate and the main purpose of the cantilevers 7 is to swing it back and forth and to maintain its approximate flatness and approximate equidistance from the tips.

The cantilevers 7 will generally be electrically conductive at least on their outer long surfaces such that current can flow between the read/write tip and the cantilever as will be discussed in the media details. An electrical path back through layer 3 to the circuitry 23 of layer 2 would be provided. For silicon, this can be achieved by doping it either in the bulk form or by doping selected regions as by diffusion or ion-implantation, employing techniques widely known in the integrated circuit art. An alternative means would be to coat the long walls of the cantilevers with thin CVD tungsten.

Figure 3A:
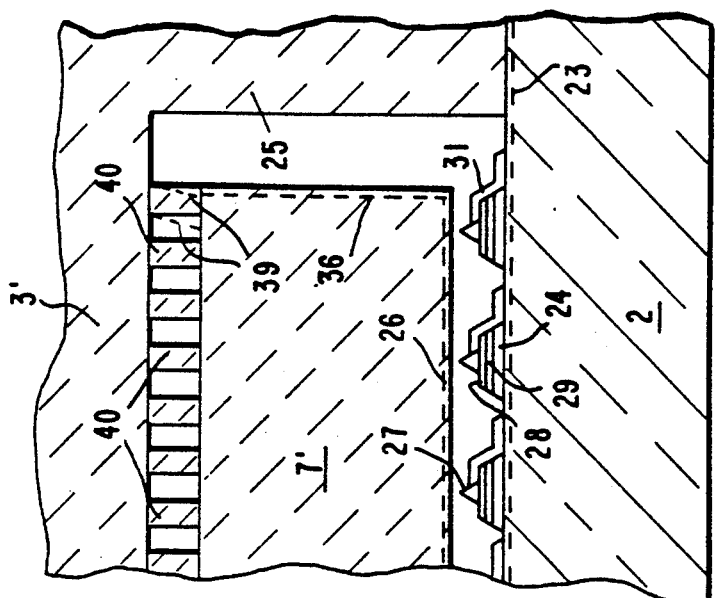
FIG. 3a–c depict three alternative embodiments which have advantages when data is to be multiplexed to/from several tips at once.
Figure 3B:
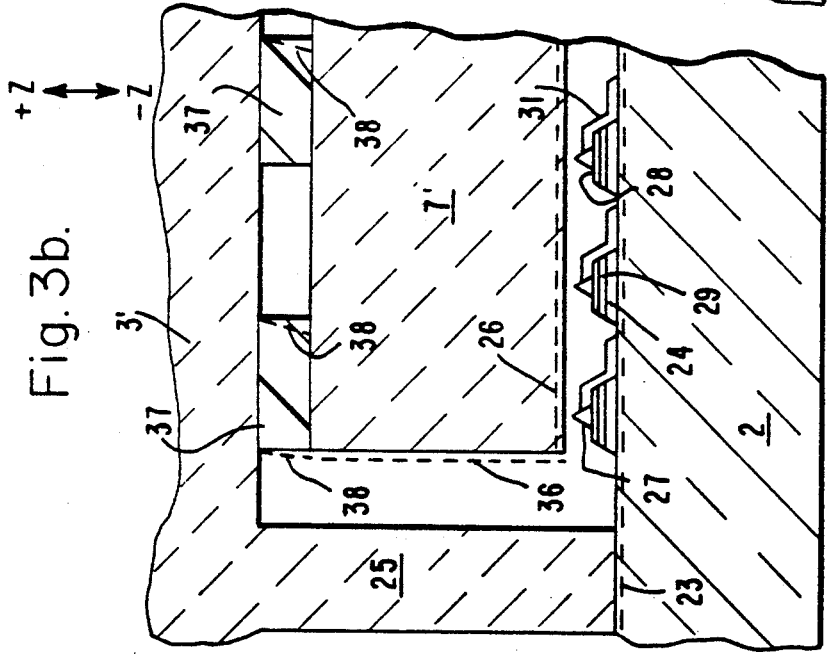
Figure 3C:
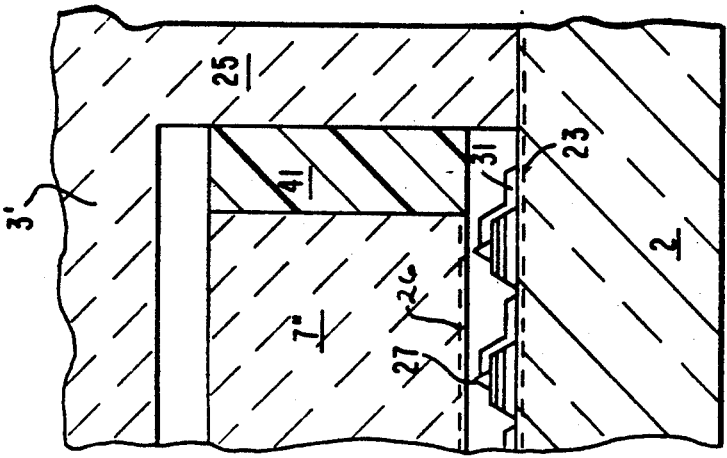

Reference is now made to FIGS. 3a–c, which are views similar to that shown in FIG. 3, wherein are presented separate embodiments in which instead of individual cantilevers directly supporting each bit array 26, a rigid plate 7' or 7'' supports a wide area consisting of many bit arrays 26, with the plate 7' or 7'' being swung back and forth in pseudo-planar motion on an elastic foundation which may have two forms.

Referring first to FIG. 3a, individual, relatively long and narrow cantilevers 40 join the vibrating plate 7, to the "cantilever plate" housing 3'. These cantilevers are much like those of the previous Figures, except that their function is not to themselves support bit arrays 26, but to swing a bit-supporting plate 7' to which they are all bonded. One advantage of this approach is that the surface of the plate 7' containing the many bit arrays 26 of FIG. 3a remains flat and parallel to the tips 27 and, even more importantly, the gaps between the tips 27 and their adjacent bit arrays are nearly equal and in exact phase. This can be important in applications wherein one wants to multiplex data to/from multiple tips and does not want to dedicate electronic circuitry to making phase angle corrections to allow for the motion of individual cantilevers (as used in FIGS. 1-3) being slightly out of phase with each other. Indicated on the right hand side of FIG. 3a are the displaced positions of the cantilevers 40 by phantom lines 39 as well as the displaced plate 7' by the phantom lines 36. It is to be emphasized that with a plate 7', phase angle corrections may only be necessary for extremely small bit sizes and that such corrections can be made relatively simple by employing disk drive-like schemes wherein location information is formatted onto the disk in the form of tracks and sectors. With cantilevers 7 of the previous Figures, phase angle corrections will be more frequently employed.

Referring now to FIG. 3b, a very similar arrangement is depicted, with the exception that the plate-supporting cantilevers 40 have been replaced by elastomeric spacers 37. The deflected position of spacers 37 is shown as phantom lines 38 and the resulting plate 7' displacement as 36. These elastomeric spacers 37 deform in shear, as opposed to mainly bending for long relatively narrow cantilevers 40 of FIG. 3a.

There are several potential advantages of the structure shown in FIG. 3b in addition to the multiplexing advantage common to FIGS. 3a–c. First, a shearable elastomeric material is also a material that damps vibratory motion and is capable of being applied using thin-film or lamination techniques. Thus, although it will take more power to drive such a plate 7', one would be able to achieve some degree of ambient isolation. The Z-axis stiffness in this elastomeric spacer 37 scheme is worse than that of the cantilever 40 scheme of the RHS or any of the previous structures.

Within the scope of this invention are schemes wherein the cantilevers 40 of FIG. 3a or the spacers 37 of FIG. 3b are replaced by either a continuous or segmented film of piezoelectric material which serves to vibrate the plate 7' (or actively isolate outside vibrations, or both). If cantilever 40 or spacer 37 is replaced by such a piezoactuation film, it would possibly eliminate the need for the PZT resonator 1 which has been the driving means discussed up to this point.

Referring now to FIG. 3c, there is shown an additional chamber on the other side of isolation web and stiffener 25 and yet another swinging plate 7''. Two more key variations on the arrangement of the swinging bit-array carrying plate will now be described.

The first alternative embodiment for supporting and driving the plate 7'' eliminates the cantilevers 40 and the elastomer spacers 37 completely as shown for the plate 7''. Instead, an elastic or elastomeric material 41 is used to attach plate 7'' at one or more points on its edges to its adjacent walls 25 of cantilever layer 3'. One such supporting spring 41 is shown.

An excellent example of such a structure could be made monolithically out of an anisotropically etchable material such as silicon. The plate 7'' could be defined by etching (from either the +Z or −Z direction in FIG. 3c), at which time the springs 41 are also lithographically defined and simultaneously etched. Thus, the cross-section of the springs 41 is constant as one passes along the Z-axis, as only such a condition can result from directional etching with no secondary operations within one material. Such springs 41 may, for example, be straight cantilevers which meet the plate 7'' edge at an angle to provide compliances in the plane of plate 7''. A host of possibilities, including V-shaped springs and curved springs as viewed along the Z-axis, are all attractive. Such springs may be arranged to induce two-dimensional motion, given only a one-dimensional resonator excitation.

The plate 7'' could be mechanically freed on its backside opposite the bit array face by, for example, wet-etching away a selectively etchable film such as $SiO_2$. In such a scheme, one starts with a silicon wafer, deposits or grows a release-oxide, then deposits the plate material, which may be polycrystalline silicon, for example. The structure can then be made by masking, dry etching directionally, then undercut-wet or dry oxide etching. In this particular scheme, the movable plates and web-wall grid would make up a perforated plate-like subassembly of cantilever layer 3, and this layer would be later covered on top by a capping solid layer to seal it. Alternatively, the plate/spring/web-wall perforated layer can be throughetched anisotropically out of a piece of monocrystalline or polycrystalline silicon without any undercut release process. The advantage of this type of approach is that a deep (in the Z-direction shown in this and previous Figures) thin spring whose cross-section is constant along the Z direction and whose compliance in the plane of the plate 7'' is of selected stiffness and compliance in the Z direction is nearly zero is easily made, which results in nearzero movement of the plate 7" in the Z direction and any desired stiffnesses in the plane of plate 7". That is to say that this approach virtually eliminates the necessary harmonic tip gap corrections to account for the not-quite planar motion of the cantilever bit-arrays of FIGS. 1, 2, and 3 or the still non-zero Z movement of the two 7' plates supported by either spacers 37 or cantilevers 40 in FIGS. 3a-c. Plates 7" or 7' may be arranged to incorporate hollow spaces under its bit-array surface to reduce its mass and thus increase the possible peak resonant frequency at constant spring stiffness. In this alternative embodiment for the plate 7" or 7', the driving of the bit array plate is preferably done with resonator 1 (not shown in FIGS. 3a-c). This also applies to the plates 7'.

A second embodiment for supporting and driving the plate 7" replaces the just-discussed springs 41 with piezoelectric material 41. This piezoelectric material such as PZT or PVDF is driven by electrodes (not shown) deposited on both the walls 25 and edges of the plate 7". In this approach, the resonator 1 is not necessary. A combination approach wherein some plate edges are driven by piezoelectric material 41 and other edges are supported and mechanically preloaded by springs 41 is also within the scope of this invention.

The basic theory and design criteria for building stacked or layered piezoactuators (herein referred to as non-monolithic) to achieve large deformations is wellknown; see, e.g., Ref. 7. The basic theory is applicable to extremely small piezodevices formed by thin-film methods as well, so long as the material constants of the piezomaterial in its thin-film form are known.

FIGS. 4a and 4b both show in section a bending beam 47 formed over a cavity 45 in material 55 which is the basis of tip/actuator layer 2. Also shown are integrated tip/actuator electronics 23 and the actual tips 27 each of which sits directly on its respective fine actuator consisting of layers 28, 29, and 24 as well as interconnections 31 and 44. Contact vias 43 permit electrical connection of tip/actuator interconnects 31 and 44 to electronics 23. In FIGS. 4A and 4B are also shown in phantom the moving adjacent cantilevers 7 (or plate 7' or 7") on which resides bit-arrays 26. In both Figures, the beam 47 is distorted in such a fashion that the tip/fine actuator is brought very close to the adjacent bit-arrays 26. A fusible and reflowable material such as a solder or reflowable glass or polymer 46 is depicted in cavity 45 in its rigid solidified state having locked the beam(s) 47 in their coarse-corrected positions.

Beams 47 of FIGS. 4a and 4b are shown incorporating an altered or additional layer of material 42 different than adjacent material 48 out of which the beams 47 are patterned and etched using conventional micromachining means. Examples of attractive materials include single crystal device-grade silicon for layer 55 and monocrystalline silicon, polycrystalline silicon, silicon dioxide, silicon-nitride, silicon-oxynitride, or CVD or sputtered refractory metal for layer 48. Numerous data on such conventional cantilever formation techniques exist in the micromachining and solid-state sensor literature (see, e.g., Refs. 8 and 9) and it is not the purpose here to review them.

While forming such microbeams is routine these days, several methods of controllably deforming them and locking them in place to achieve coarse gap corrections will now be described. It is abnormal to lock beams in deflected positions for existing technologies which utilize microbeams. This is because the beams usually are employed to sense static, dynamic or inertial forces or mass and must be deformable in use to do this.

This invention may employ any of several driving means for deflecting the coarse correction beams. These include: (a) bending induced by a laminated beam having materials of differing expansion coefficient which undergo a temperature excursion or of a single material supporting a temperature gradient as induced, for example, by an implanted resistor in silicon; (b) bending induced by a laminated beam incorporating one or more piezo films to form a unimorph or bimorph (see Ref. 7); (c) bending induced by Coulomb repulsive or attractive forces wherein the cantilever and the cavity are each charged to different electrical potentials; (d) bending induced by externally applied forces or accelerations as by putting the cantilever (with its suspended tip/fine actuator mass) in a centrifuge and causing the weight of the mass to deflect the beam or alternatively as by pressing down lightly on the tips with the bit-array or other flat reference surface; (e) bending induced by the capillary forces of wetting or beading-up of a liquid material as for locking material 46 in its flowable state; (f) bending caused by the attractive or repulsive forces due to the interaction of an imposed magnetic field with magnetic films or flowing currents implemented on the beams; and (g) bending induced by a differential pressure applied across the beam, which in this case would consist of a deformable diaphragm which could maintain a pressure differential across it.

It is to be emphasized that bending will preset the tip/array gap, but in an absolute sense, the beam may be moved in either an upwards or downwards manner to accomplish this. Also to be emphasized is that beam 47 may take on virtually any form ranging from a bar-like rod to a full plate-like diaphragm to complex spirals and multibeam/mesh structures. So the term "beam" is used loosely herein.

This invention may employ any of several means to lock the coarse adjustment beams in their corrected positions such as:

A. Utilization of a material 46 which melts and whose wetting action bridges portions of the beam-cavity gaps and solidifies in place to lock the beam. Such a material could be a degassed solder or flowable glass initially deposited in thin-film form which beads up during flow. Examples include the indium-lead family of alloy solders and the boron/phosphorous/germanium families of reflowable glasses. Such materials would optimally be predisposed as thin-films.

B. Utilization of a material 46 deposited by chemical vapor deposition, such as tungsten by CVD using tungstenhexafluoride, which bridges the beam-cavity gap and locks it in place. Using CVD tungsten to bind joints within the beam 47 itself is also within the scope of this invention, as is employing the stress caused by such a deposition to favorably move the beam. Finally, the beam may actually be made to be deflected too high from the start and the bitarray structure or a flat reference surface used to planarize the tips before locking. The use of CVD tungsten to change the size of the tip as part of a gap correction measure during assembly is also within the scope of this invention.

Included within the scope of the invention are approaches wherein the permanent locking means are not employed because the user wants to park the tips far from the bit-arrays when not in use for shock protection, and during device operation, the problem of the flexing cantilever is ameliorated by, for example, actively driving the microactuator cantilever 47 with one of the above-described means in neutralizing response to unwanted external vibrations as well as to possibly compensate for gap changes due to cantilever-plate swinging. In AFM, a sensing tip is affected by forces on it caused by a sample having, for example, local mass or charge or mag-netic poling variations. This contrast (the bit-contrast as applied herein) is detected by vibrating the tip at high frequency relative to the sample (the bit-array herein) and detecting the changes in the otherwise stable oscillation frequency of the tip caused by the forces imposed by the sample. In this invention, cantilever beams 47 may serve to oscillate the sensing tips 27 in that manner, assuming they are not fused in place by material 46. Cavity 45 would serve as a capacitive displacement sensor for tip 27.

Thus, AFM techniques which are capable of seeing contrast on insulating and magnetic samples (bits) without using any electrical currents through the bit-array can also offer contrast capabilities to further the selection of media for this invention.

As a final variation on beam 47, if the fine-actuator is eliminated and the tip is incorporated into the beam itself, for example, as the sharp point of a V-shaped beam wherein the pointed end flexes toward the bit-array 26, then the previously described driving means may be used to controllably deflect the pointed beam 47 for device operation. Such an approach would best employ a stiff, yet deformable diaphragm (plate-like, possibly perforated) or a multipiece beam with high resonant frequency and rapid response time. The objective here would be to have a large range of deflection yet a high stiffness so both coarse and fine deflections could be accommodated without locking.

Figure 4C:
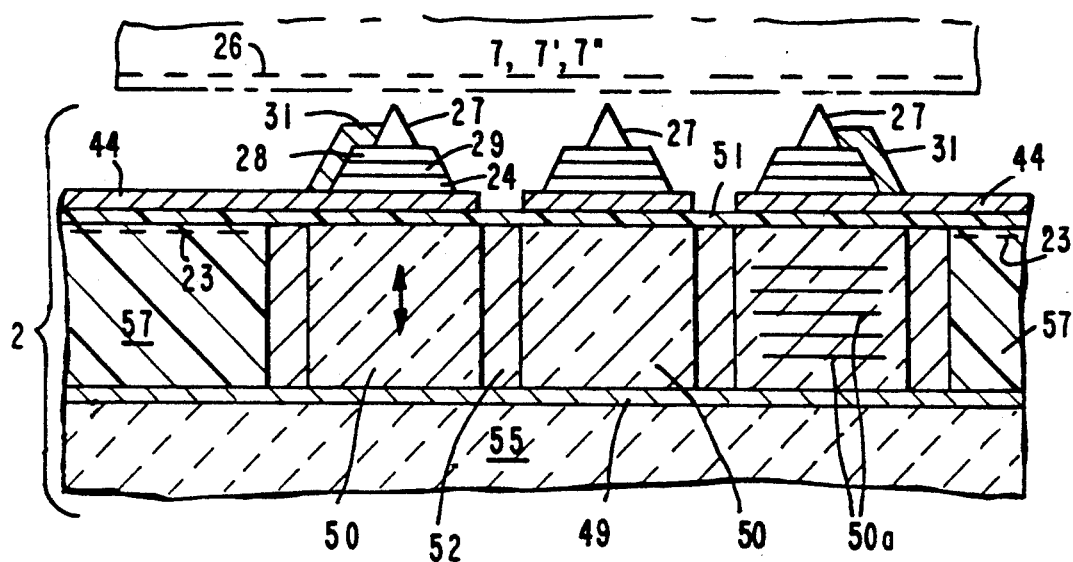
FIG. 4c shows in cross-section several tip/fine actuator sets whose supporting means for providing coarse adjustment each consists of a piezoelectric support which undergoes thickness deformation just as the fine actuation piezomaterial does and which is multilayered and thus has appreciable extension.

FIG. 4c shows in section another approach to tip/fine actuator coarse adjustment. Shown are three tip/fine actuator sets, each sitting on its own support consisting of a piezomaterial 50 which may itself be of multilayer design with multiple internal electrodes 50a as shown for the rightmost piezomaterial support 50. Thus, in this approach, since the coarse adjustment is not locked by physical fusing or bonding, the coarse adjustment might only be applied for device use and left unapplied when the device is not being used. Alternatively, the voltage causing the coarse deflection may be left on during such periods. This would amount to electronic clamping. Such an actuator might also be used to actively suppress externally applied unwanted vibrations.

In FIG. 4c, a flexible thin web 51 of, for example, polyimide covers the individual piezoactuators 50 sufficiently that interconnections of the type 31 and 44 can be routed from tips 27 and the fine actuator top electrode 29 to the tip electronics 23 which resides in adjacent silicon 57 through vias of the type 43 (not shown). In FIG. 4c, interconnect 44 is shown to be the base electrode of the fine actuator, whereas 31 is connected to the tip itself. Additional electrodes, such as one to connect to the fineactuator top electrodes 29, are not shown. The tops of the individual piezoactuators 50 would, underneath layer 51, have electrodes (also not shown), while a common base electrode 49 for all three actuators is shown. The space 52 between the coarse actuators 50 may be filled with an elastomeric material so that layer 51 has a continuous surface on which to be formed.

In FIG. 4c, underlying substrate 55 does not necessarily have to be a semiconductor material, so long as there are no electronics to be integrated into it. An alternative embodiment of FIG. 4c does have 55 (rather than 57) being a semiconductor with integrated electronics and 57 being a dielectric spacer containing contact vias which creates a flat surface for flexible layer 51. In this case, if layer 57 were, for example, thick spun-on polyimide it could also fill cavities 52 and simultaneously serve the function of flexible layer 51. It should finally be mentioned that the electrodes on the top of the actuators 50 (not shown) may be of, for example, gold which can act as an etch mask for the patterning and etching of stacks 50.

Figure 4D:
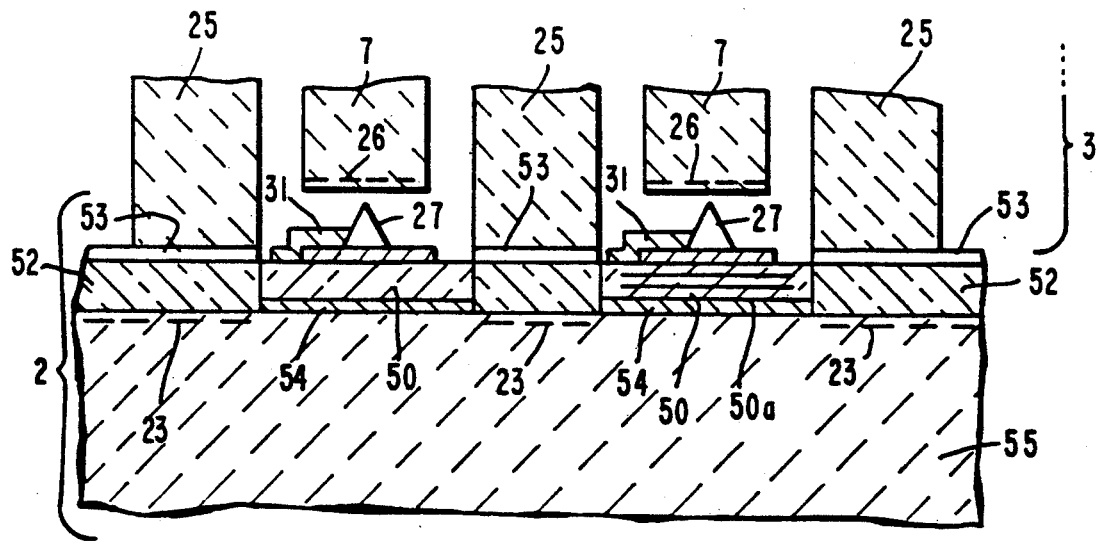
FIG. 4d shows tips having only a single actuator which provides both coarse and fine adjustments as necessary; the single actuator is the support and it may also consist of a multilayered piezomaterial to enhance extensional performance as in FIG. 4c.

Moving now to FIG. 4d, there is shown in similar section a view of two tip/actuator sets, each resting on a single multilayer piezoactuator 50 which serves coarse adjustment as well as fine adjustment needs. Underlying semiconductor substrate 55 contains the tip electronics 23. Bottom electrodes 54 and interconnects 31 for activating the piezo stacks 50 and tips 27 are shown, while top electrodes for the stacks are not shown. A layer 52 of material such as silicon dioxide serves to offer a planar surface for bondline 53 and interconnections (not shown). Layer 53 is a bondline of joining material for bonding the tip/actuator layer 2 to the web-walls 25 of cantilever (plate) layer 3. This joining bondline may consist of a low temperature diffusion bond, a reflowed glass or solder bond, an anodic bond, an epoxy bond or any other permanent bond or rigid clamping or fastening arrangement which is executed at a low enough temperature that the device is not damaged.

In both FIGS. 4c and 4d, the piezomaterial 50 may be flexible PVDF, which can be spun or cast into recesses such as those defined by layer 57 of FIG. 4c and layer 52 of FIG. 4d. PVDF can also be laminated in very thin layers. With PVDF, it is known that surface deflections can be obtained using only two adjacent surface electrodes with no underlying electrode. This approach is expressly included as an option to implement actuators 50. PVDF-type piezofilms are discussed in, for example, Refs. 10 and 11.

Figure 4E:
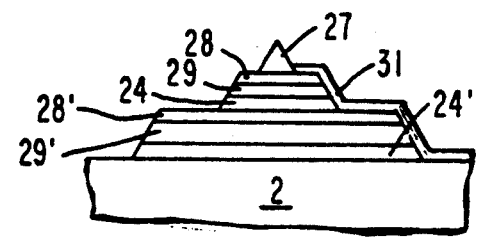
FIG. 4e shows a tip supported on a microactuator in turn supported on a second microactuator, with one microactuator providing fine adjustment and the other providing coarse adjustment.

FIG. 4e depicts yet another scheme, in which a first microactuator stack, for fine control, is disposed on top of a second microactuator stack for coarse control, the primed numbers having the same function as the corresponding unprimed numbers.

The processes for making the tip and associated fine actuator are available from technologies used to build micro-vacuum tubes, ferroelectric-RAMs, and integrated circuits; see, e.g., Refs. 12-17. Ref. 12 shows microscopic emitters similar to tips 27. These are formed using either the evaporation and subsequent liftoff lithographic technique wherein the tips are grown in the bottom of patterned round holes or alternatively by isotropic wet or dry etching combined with oxidation of single-crystal material such as silicon as are both extensively practiced. The tip materials for this invention may, for example, comprise tungsten, tungsten alloy, such as tungsten-rhenium, doped tungsten, platinum, platinum-iridium alloy, molybdenum, silicon (or doped silicon), doped diamond, or any refractory metal such as tungsten or molybdenum coated with platinum, iridium or platinum-iridium alloy, or conductive ceramics. These are all known good performers in AFM and STM. The nature of the liftoff process and isotropic wet and dry etching plus oxidation processes is that very sharp pointed cones of metal or monocrystalline material can be deposited and/or etched, respectively. Sharp points permit closely spaced bits in the bit-array to be discriminated from each other in reading or writing.

The tips may be provided with a conductive coating thereon for improved performance. Examples of suitable tip coating materials include nickel, gold, platinum, iridium, rhodium, tungsten, and rhenium.

Refs. 13–17 show the existing capability for depositing piezomaterials in thin-film form, albeit they are not being used as actuators but as memory cells (in which case their ferroelectric properties are utilized), as resonator clocks, or as optical fiber coatings wherein their piezoelectric properties are utilized.

Refs. 13 and 14 utilize sputtered thin-film PZT, while Ref. 15 utilizes spun-on PZT as done with the sol-gel process.

Other work using sputtered ZnO thin-film piezomaterial is described in Ref. 16, which utilizes both thin-film ZnO piezomaterial and thin wet-etched silicon membranes to create an oscillating structure. The use of AlN in similar applications is also described. It is to be noted that such resonator process approaches are directly applicable to implementing the deformable microactuator beams 47 described herein as having piezofilms 42 incorporated in them and that this technology is compatible with simultaneous integrated circuit fabrication. In such an approach, the tips 27 of FIGS. 4A and 4B would sit on an insulated beam or diaphragm 47 directly, and beam/diaphragm 47 would deflect itself (or oscillate itself) at will by pulsing thinfilm piezomaterial 42. Along the same vein, material 42 may consist of a resistive heater which induces controlled bimetallic-like bending.

Ref. 17 shows resonator structures supported only on their edges, again which could be employed to implement the type of structures such as beam 47 and the fine/coarse actuators described herein.

Moving now to the bit media in which bit-arrays 26 are implemented, it will be appreciated by those skilled in the art that the bit-array is that area of the bit media which is addressable by one read/write tip 27. There are two general cases to be described: The first employs non-erasable media for the read-only memory application and the second an erasable media for the read/write memory application. Given that STM and AFM technologies have succeeded in generating atomic resolution high-contrast images of virtually every solid material of technological interest, as would be expected from a high-performance microscopy tool, the issue of being able to achieve the desired contrast on the desired scale and read it, at high frequency is already demonstrated for very small numbers of written features written with relatively huge and massive single-tip STM/AFM microscopes. Thus, the issue becomes one of using the tip to create such contrast and stable features and later neutralizing the contrast of those written features; i.e., erasure, in the rewritable memory application. This invention is amenable to the use of many of the media which are imagable in a stable manner in the aforementioned microscopy applications. The many modes of tip operation involving flowing current known to STM are most easily implemented; especially the constant tip-height mode and the spectroscopy modes.

This is not to say that AFM techniques are not applicable to this invention. Indeed, it has been discussed how beams 47 of FIGS. 4A and 4B could be employed to implement the AFM imaging mode wherein contrast is detected via a vibrating cantilever frequency change or via the magnitude of the microactuator cantilever driving signal to maintain a constant tip-to-bit gap in FIGS. 4A and 4B in the case where cantilevers 47 are free to deflect in device operation.

As a general statement, the STM techniques have higher ultimate resolutions due to the typically smaller gaps between tip and specimen. The STM modes involving flowing currents also do not require cantilevers for tip support.

In the STM approach, the constant tip-height mode permits the most rapid scanning because the contrast is sensed as either a tip-to sample voltage or current change with no required tip-height adjustment. This can be done very quickly by the tip microelectronic support circuitry without having to vertically move the tip other than for changes in the average gap dimension as caused by the relatively slower sweeping action of the bit-array 26. The STM spectroscopy mode involves sweeping the tip/bit array voltage and measuring the tip/bit-array current dependance; i.e., the conductance, at a given site or bit location at constant gap dimension or alternatively measuring current (or voltage) at constant voltage (or current) vs. gap dimension, to analyze the electronic barrier height. This must be done at very high speed if the conductance contrast of a given bit is to be measured in one pass.

Alternatively, one may measure conductance of an entire string of swept bits by taking several I vs V measurements over several passes. Such conductance plots, or derivatives of such plots, can show electronic structure which itself can serve to offer a binary off/on bit-state. Finally, one may implement an analog bit mechanism wherein instead of either sensing (or not sensing) a binary zero/-one or off/on bit state, one senses its analog counterpart wherein there are more than two degrees of state into which the bit can be driven, sensed and discriminated.

The potential media can be grouped into several classes and this list is not meant to be exclusive, as new ones uniquely applicable to this memory structure are anticipated as are applicable imaging modes for the STM and AFM. For most bit-tip arrangements, the STM-like resolution; i.e., the size of the smallest distinguishable bit, can be given by Ref. 1, Equations 8, 9, and 10. As can be seen, a bit size and pitch of 10 Å and 20 Å, respectively, is not unreasonable. This can offer an astonishing $2 \times 10^{12}$ bits in a one-cm$^2$ device consisting of 10 million 1 $\mu$m$^2$ cantilevers, each having 250,000 bits. Even relatively large bits of, say, 100 Å size and 200 Å pitch can offer devices with as many as $2 \times 10^{10}$ bits. This places the technology in the forefront with regard to capacity as well as bits/cm$^2$.

In general, the bit contrast is implemented/erased by (a) creating or altering topographic features or local composition, (b) altering crystalline phase, (c) filling or emptying of existing electronic states, (d) creation and destruction of electronic states, (e) creating or altering domain-structures or polarization states, or (f) creating or altering of chemical bonds. Some media may employ more than one of these mechanisms, and mechanisms for reading and writing may be different. A discussion of examples which fit one or more of these categories will now be given.

In general, the STM-type media are, at least in part, electrically conducting or semiconducting such that electrons can be transported from (or to) the tip to (or from) the media across the tip/bit-array gap which is maintained on the order of a few to about 10 to 15 Å in average size for the highest resolution in the tunneling-mode. Obviously, the larger gaps correspond to the larger bit sizes. The tip/bit-array relative voltage for these media are in the few millivolt to few volt range. Tip/bit-array currents are typically on the order of 5 nanoamps when operating in the tunneling mode. The plates or cantilevers supporting the bit-arrays 26 are sufficiently conductive that electrons can be conducted away (or to) the media regions. The plates or cantilevers may be electrically isolated from one another so as to accomplish electrical discrimination between subdevices so that multiple subdevices can be written/read simultaneously. The media, as well as the tip, are preferably situated in the evacuated confines of the device, but having the tip/media operate in a gaseous or liquid environment is possible for many of the non-reacting and non-absorbing media and tip materials, and the limiting factor in those cases becomes the impact of the gases or liquids on the desired cantilever or plate oscillations and the stability of such gases and liquids in the presence of the electrons and electron-induced heating of the tip/bit-array current. Obviously, if such gases or liquids are not stable and produce deposits and/or etch pits in the bit-array at the operating tip-site, this phenomenon can itself be used to create/destroy bits.

Creation/Alteration of Topography or Composition

In the most general description, all contrast in the STM constant-current mode is due to changes in the amount of over-lapping of the electronic clouds of the tip and the adjacent specimen-atoms as the tip is scanned relative to the imagable specimens (the bit array). The specimen (or bit media) may present to the tip a varying surface electronic state because as the tip is scanned at a constant average distance (and current), for example, protuberances on the atomic scale decrease the gap distance momentarily which cause increased electron-cloud over-lap and thus increased tunneling current at constant voltage. Conversely, for atomically smooth specimens, there are still variations in the electron cloud density of the individual surface atoms laterally as well as vertically due to the directional nature of atomic bonding. This accounts for the beautiful images of cleaved graphite and silicon widely published. Finally, different atomic species having different bonding can be seen amongst each other even if the surface is atomically smooth.

Given the above, any physical or chemical alteration which can be implemented with the tip and detected with the tip is a candidate read/write mechanism. This covers a plethora of obvious means such as surface deformations caused by tip-induced heat, electrostatic fields or outright mechanical contact, desorption/absorption/adsorption of volatile/condensable species, chemisorption and desorption of bondable species, actual surface modification by touching of the tip to the media, doping as by deposition and/or diffusion of ionic species under the influence of an electric field and electron-induced heating, deposition as by disassociation of a reactive metal organic gas or liquid by an electron beam, deposition as by electroplating in a liquid media, etching as by vaporization or electrolytic etching, implantation as by the acceleration of ionic species into the media by an electric field, and manipulation of the atomic surface structure, particularly with regards to atomic surface coordination. Many of the above can make use of the fact that erasure can be implemented either by tip-induced heating or by macroscopic heating of the entire bit-array as by local resistive heaters. Some specific references will be made of examples of many of the above.

Ref. 18 describes the reversible formation of microbumps or hillocks which can serve as data bits. These are formed in an amorphous glassy metal $Rh_{25}Zr_{75}$. The film is first rendered ultra flat with an ion-milling process. Other metallic glasses are also candidates for the film.

Ref. 19 describes an application wherein the lower resolution emission-current mode is used to operate the tip for purposes of generating 5 to 40 eV electrons capable of causing chemical disassociation and deposition of gold and tungsten or alternatively of insulating materials useable as bits. Disadvantages include tip deposition and coarse bit-pitch.

Ref. 20 describes the electrolytic deposition and etching of metals within an anionically conducting polymer using an STM. The process described could be employed herein, but one does not necessarily need to actually form macroscopic metallic deposits. The stages before detectable metallic deposits grow wherein the mobile ions are highly concentrated under the electrode can be used to offer electrical conductivity contrast. If the doped polymeric deposit is kept very thin and the ion concentration high enough so the combined effect is a significant, through-film leakage current, then the tip can be swept without contacting the polymer, and tunneling or emission electrons will flow into and through the film.

Ref. 21 describes a particular gold/polymer conductive matrix and refers to a $W/Al_2O_3$ Cermet matrix material, both of whose properties are applicable to the media 26 herein. In the regime wherein the conductive particles are largely insulated from each other than for interparticle tunneling currents, one may manipulate the situation to advantage with the tip. By locally heating a region of such a film, one may induce irreversible particle coalescence and vast conductivity change. Alternatively, one may choose to pass tunneling or leakage currents through such a film using the tip to actually create electrostatic charges on the metallic clusters. In this manner, the local conductivity can be affected in an area-wise manner to form bits which can be erased.

Ref. 22 describes how extremely thin ultra-smooth gold films can be scanned using STM. Such films can be physically altered by the tip by local melting and subsequent hillocking or bulging to form topographic bits using some of the mechanisms described in Ref. 18.

Ref. 23 shows reference to hillocks similar to those in the Rh-Zr film discussed above.

Ref. 24 describes how oxygen adsorbates cause imagable contrast on a GaAs surface. In an application to this memory, it would be difficult to employ freshly cleaved and ultra-flat, atomically clean surfaces and ultra-high vacuum for implementation of bit arrays 26. An alternative approach would employ a bit array 26 wherein the bit is written by desorbing a bit location from an otherwise fully adsorbed surface with otherwise 100% local adsorbent coverage. This is because for some substrate/adsorbate systems, it is easier to maintain a defect (a vacancy) in an otherwise continuous film than it is to prevent additional defects (atoms) on an otherwise atomically clean surface. The ease of keeping a surface free of adsorbates is given by the sticking coefficient. Adsorbed species or chemisorbed species may include single atoms or ions, molecules or microclusters of multiple atoms showing only extremely short-range order. Molecules may be pre-attached using the Langmuir-Blodgett (LB) technique as described in Ref. 25. This reference describes how such adsorbents can also be destructively erased using the tip. Ref. 26 describes how individual metal adsorbates can be seen against a graphite substrate. Graphite imaging itself does not require high-vacuum operation.

Alteration of crystalline phase

A material such as amorphous silicon may be converted to crystalline silicon with a localized heating of the media caused by a current pulse from the tip. Conversely, if an even shorter pulse were to be used, a crystalline material could be rendered more amorphous-like if it melted and cooled quickly enough to avoid grain-growth. These methodologies are similar to those employed in splatcooling and laser thin-film processing to attain metastable amorphous or metallic glassy states.

Filling or emptying of existing electronic states

Silicon dioxide films are known to contain several charge states both in their bulk and at the silicon/oxide interface. Hydrogen is known to diffuse into such films and fill such traps. Additionally, certain ionic contaminants such as sodium and potassium are known to diffuse through such films quickly, especially under the influence of an electrical field. The use of the tip with extremely thin oxide films as media wherein traps are created then filled/emptied by charge injection and/or tunneling induced by the tip could be employed to create bit contrast. A tunneling current sufficient to control the gap distance would be made present to prevent tip/media collision. Ion implantation into such oxide, oxynitride, nitride or other dielectric to enhance leakage and/or the concentration of chargeable states for these purposes could be practiced.

In an alternative embodiment of the above, the thin film dielectric would be doped with a mobile ionic species such as sodium or potassium and the tip would be employed to create bits by accumulating or depleting the local concentration of such species to create contrast in the tunneling current or conductance. In a non-STM-like approach, one can utilize the AFM-like capability of the tip resting on a vibrating cantilever to sense (without current flow) the electrostatic charge of charged regions.

In yet another arrangement, hydrogen-doped amorphous silicon or selenium photoconductors could be employed as media wherein the tip would dispense charges in a bit pattern on an uncharged or uniformly charged film of such a material. By exposing such a film to illumination, which makes the photoconductor bleed off any charge it holds, one may also implement erasure. In such an application, one might choose to implement the moving cantilevers or plates in transparent material such that the illumination could be directed at the bit-arrays from behind. In this approach, each individual bit-array is erased as opposed to each individual bit within a bit-array. Given that one may have millions of individual bit-arrays, this is not seen as a drawback. The erasure illumination may be provided on a selective bit-array basis as by a locally implemented light-emitting diode (LED) or solid state laser. Erasure or media initialization (i.e., pre-charging) may also be implemented by operating the tunneling tip in the emission mode wherein either the tip or the adjacent media location thermally emits electrons by thermionic emission or field emission. For low bit densities, these emission modes may also be used to write bits.

Creation/Destruction of electronic states

Ref. 27 describes the well-known use of silicon nitride to trap bulk-distributed charge which can be both written and erased with voltage application. An extremely thin silicon-nitride thin film could be programmed with charge and that presence of charge sensed by the change in tunneling behavior. The charge states induced in the film would alter the tunneling and steady state leakage currents for purposes of sensing using standard STM-like methods. Sector or track regions may be provided in the bit arrays with unaltered media material or other material with a known constant leakage for gap control.

Ref. 28 describes a mode of STM operation applicable to such very thin insulating or conductive multilayer media. Therein, the ballistic nature of low-energy electrons allows such electrons to penetrate thin layers of an intervening film and be collected by an underlying substrate which acts as a terminal. This type of 3-terminal arrangement permits probing of the defects, the film conductivity and the interfacial barrier heights between such very thin stacked sandwiches. This approach is seen as widely applicable to media which utilize electronic trapping, mobile ionic species, and contrast due to variations in the barrier height caused by current-/heating exposure from the tip.

Creation/Alteration of domain structures or polarization states

Ref. 14 describes the use of thin-film PZT as a memory cell. Basically, a ferroelectric material such as PZT is polarized and retains a remanent polarization after the polarization field is removed. A reversed polarization voltage polarizes the material in the opposite direction or sense. Thus, the material can be used to make bistable memory capacitors having two distinct polarization voltage thresholds. Polarization is non-volatile even after the polarization field is removed. If the polarization is destroyed in sensing, it must be rewritten. Sensing involves measuring the interaction of the applied field with the polarization state via changes in the tunneling current or voltage. In the practice of this invention, the tip applies the required reading and writing voltages, preferably in a non-contact manner to very thin ferroelectric films. In addition to having the tip operate in the tunneling current mode, one may operate in the field-emission mode wherein much larger currents and voltages can be introduced to the media, albeit with a penalty in lateral resolution. In the typical tunneling mode, the electrostriction-induced physical deformation of the media material may also be sensed as topography variation.

Ref. 29 also describes the fabrication of a ferroelectric nonvolatile memory cell. It describes in more detail the reading mechanism also relevant to Ref. 14.

Ref. 11 describes the use of piezoelectric polymers applied as thin-films. Such materials could be poled by a voltage applied by the tip. Poling of ferroelectric and piezoelectric materials can cause electrostriction which is a deformation which can be sensed as a gap change. Poling direction also can be sensed by the tip by trying to pass current using a voltage akin to the original poling voltage. If current does not pass, the capacitor is already poled. Thus, two potential mechanisms exist.

Modifications involving coating the polymer with a patterned electrode or electrode having high lateral resistance could be used.

Ref. 15 also describes the use of a piezoelectric polymer $PVF_2$ as well as crystalline ZnO and PZT piezomaterials. PZT sol-gel films of 1000 A thickness are described. The use would be as with Ref. 11 above.

Yet another class of materials exhibiting a type of polarization behavior is that of polymeric electrets. These are generally polymers which can sustain electric polarization without sustained bias voltage for useful times determined by the relaxation time constant of the mobile or moving species.

An example media consists of a perfluoroalkoxy resin polymer system or "PFA" system put down as a thin film 26. By placing volatile constituents in the subdevice regions such as acetone, ethyl acetate or methyl alcohol, one may detect electrically the adsorption/desorption of such a species under the influence of the tip to/from the prepoled PFA.

Also included herein is the movement of ferroelectric/ferroelastic island-like domains within a thin film of a ferroelectric bit-array material 26 such as gadolinium molybdate, using the tip as the movable electrode with which to move the domains within the plane of the bit-array. Thus, the media becomes a miniature bubble memory.

Ref. 30 describes how cutting a single crystal material slightly off-axis can present a series of regular steps on the atomic scale at the surface. Included in the scope of this invention is the use of such off-axis surfaces to offer such ledges and kinks which can serve to offer regularly arranged preferred bonding sites if not tracks akin to those found on formatted laser CD-disks or magnetic memory disks.

Creation/Alteration of Chemical bonds

Species adsorbed on a surface may present both topographical and electronic contrast in the STM-like mode. Included in the scope of this invention is the reversible adsorption (or chemisorption) and desorption of species which are provided for the purpose within the sealed confines of the device (or subdevices). Such species may be held in place in condensed form as by condensation and later, using localized heaters, evaporated and deposited in the desired location to initialize the writable surface by either evaporating it clean or condensing on it to cover it fully. Writing data by selective desorption of such a species could be implemented using current pulses from the tip. The media surface would be treated so as to offer the species preferred bonding sites as by damage caused by ionimplantation. Condensable hydrocarbon molecules are candidates for this approach.

Figure 5A:
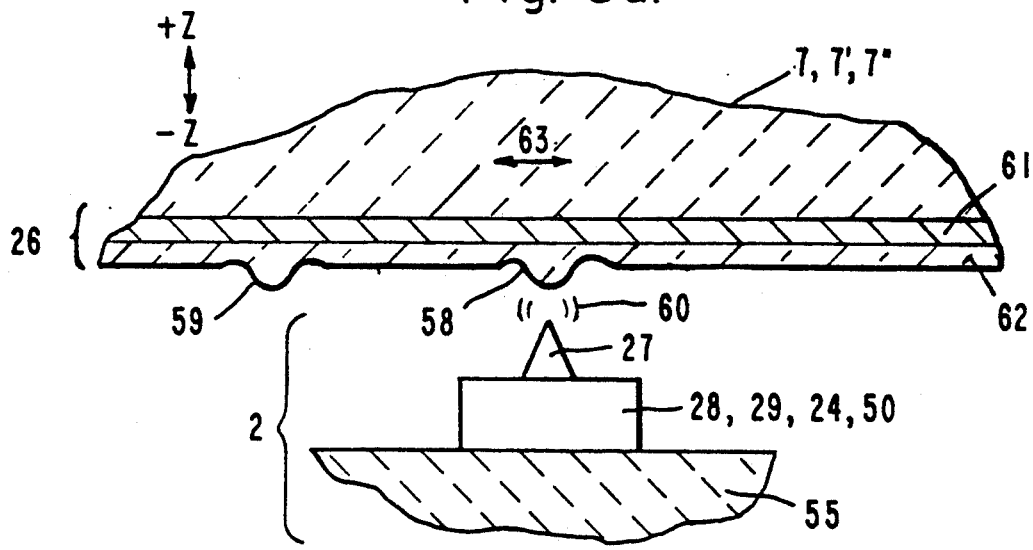
FIG. 5a is a cross-sectional view depicting one type of bit array media which could be employed on the cantilevers.
Figure 5B:
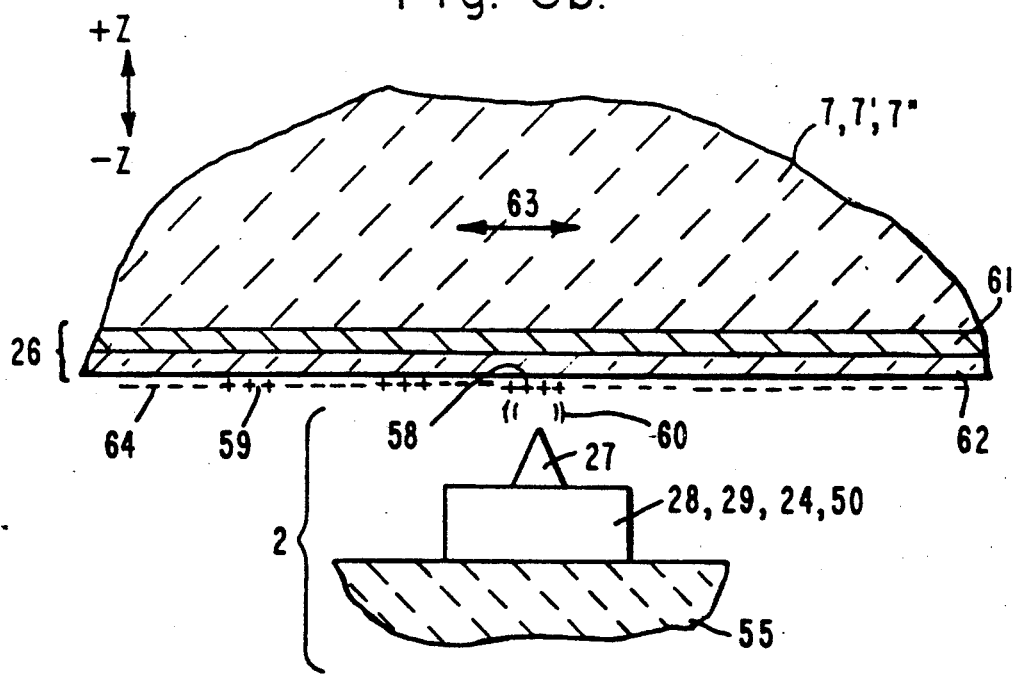
FIG. 5b is a view similar to that of FIG. 5a, depicting an alternative embodiment.

Now moving to FIGS. 5a and 5b, there are shown in section the tip/bit-array regions of two of the above example media. FIG. 5a depicts an implementation of the microbumping media described in Ref. 18 employing a glassy metal such as $Rh_{25}Zr_{75}$. FIG. 5b depicts an implementation of a media which stores bits as electrically polarized regions as described in the above discussion of Refs. 11, 14, 15, and 29 for piezoelectric or ferroelectric film-media. FIG. 5b also depicts the use of a media which employs the creation/destruction or filling/emptying of surface or bulk electronic states or traps as discussed above for materials such as photoconductors such as amorphous silicon or selenium or for insulators such as silicon nitride and silicon dioxide.

Referring now to FIG. 5a, the tip 27 is shown sitting on its supporting and actuating means 24 drawn schematically for simplicity. Scanning motion of the cantilever or plate 7, 7' or 7" relative to the tip structure is shown by arrows 63. The bit-array media is shown to consist of two layers 61 and 62 deposited in thin-film form on cantilever or plate 7, 7' or 7". Layer 62 is the glassy metal, $Rh_{25}Zr_{75}$ in Ref. 18, which can be dimpled by exposure to the current and electric field of the tip depicted by 60. A freshly formed dimple or hillock or data-bit 58 is shown adjacent the tip 27. A previously formed dimple-bit 59 is also shown. Writing of bits next to existing bits erases the old bits as described in Ref. 18. Tracks used for aiding in the locating of the bit-array in space can be written as continuous linear lines or dimples similar to the approaches used for servotracking in conventional disk-memories. Layer 61 may serve several functions such as thermal and metallurgical isolation of the media material 62 from the material 7, 7' or 7" or as an electrode in the case where material 7, 7', 7" is not conductive or as an insulator in the case where material 7, 7', 7" is conductive electrically and it is desired to not utilize that material as part of the circuit. Other layers not shown for simplicity include optional films such as lithographically-defined tracks which would be deposited on top of material 62 and patterned and removed from the actual bit area.

Moving now to FIG. 5b, there is shown a similar arrangement, with the exception that the media layer 62 now consists of an electrically polarizable or chargeable film such as an insulator, photoconductor, ferroelectric/piezoelectric, or electret polymer. For simplicity's sake, the image charges for the depicted surface charged bit-areas are not shown. They would naturally reside on the interface between layers 61 and 62, assuming layer 61 is conductive. In the case of media layer 62 being a polarizable material such as a ferroelectric, this means that the opposite pole of that written bit region would also be at the 61/62 interface. In the case of bulk charging through the thickness of layer 62, then little or no voltage gradient would exist through layer 62 at a written bit-site. In the example of film 62 being a photoconductor, the tip 27 is employed in the emission mode to negatively charge the entire surface as shown by region 64 and the tip then selectively removes electrons when positively biased to form bit regions 59 and 58 (being written). Layer 61 would serve, for example, as an electrode wherein the entire film is biased while conductive (while illuminated by a local LED) to initialize with a blanket charge 64. Film layer 61 could also serve as an insulator such that 7, 7', 7" are not in the electrical circuit.

For media which incorporate charging or polarization layers, one may also utilize active semiconductor devices or junctions in place of layer 61 or under layer 61. Such diodes, Schottky barriers or other semiconducting junctions can be employed to act as remotely switchable or biasable electrodes useful for purposes of spectroscopic bit discrimination, initialization, generation of illumination for purposes of initialization or erasure as by a solid state light-emitting-diode or as maintainers or refreshers of written bits.

Figure 6:
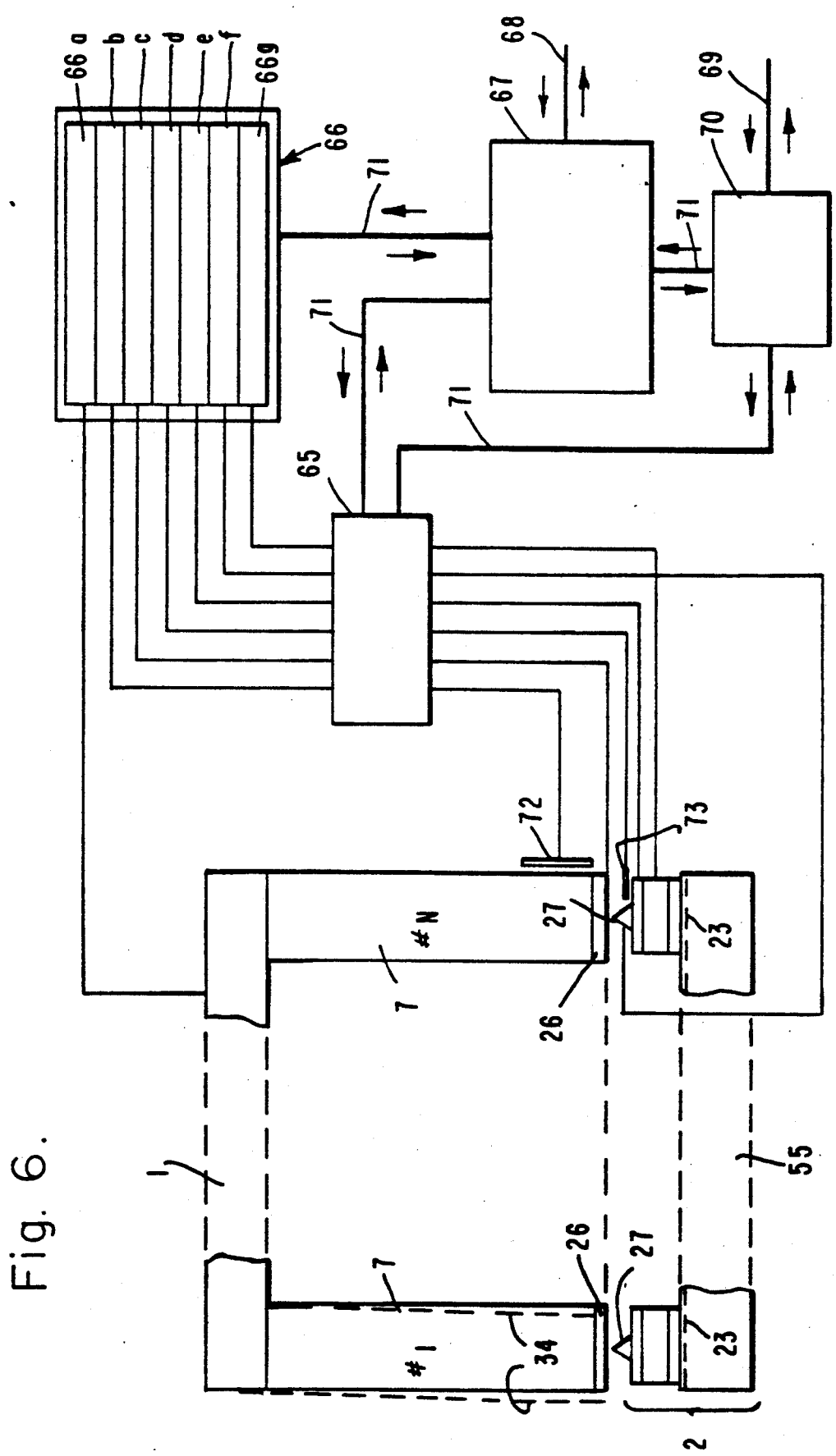
FIG. 6 is a schematic block diagram of the electronic circuitry of the memory device.

Moving now to FIG. 6, there is shown in schematic form an overall implementation of the memory device. On the left are shown the primary electromechanical constituents such as the driving resonator 1, the cantilevers 7, the bit arrays 26 and the tip/microactuator layer 2. It will be appreciated that in this schematic representation, the driving resonator is shown directly connected to the cantilever 7. However, in actuality, the mechanical connection is preferably made through layer 2, as shown and described earlier. An important reason for this is that the electronics of layer 2 are more easily able to shed dissipated power via thermal conduction.

On the right hand side are shown a variety of electronic support functions which, although broken out for viewing, may actually be physically integrated in the device itself. The items shown include a microprocessor 67, a multiplexer 70, a group of circuits primarily consisting of power supplies, sensing circuits and digital-/analog and analog/digital conversion circuits 66, and a means for switching, 65. The switching means 65 permits all of the previous functions to be properly addressed to/from the correct bit/array(s) and tip/microactuators.

For the highest performance, it is beneficial to integrate most or all of this circuitry into the previously discussed region 23 of layer 2. This will minimize capacitance and inductance as well as maximize signal propagation integrity, thus maximizing the achievable cantilever scanrate for a given bit-density and signal-to-noise ratio. Other regions 23 of such circuitry integrated into other parts of the device are likewise possible as the structural materials employed, such as silicon, are capable of such a function.

Within the group of circuits 66 is a resonator high-voltage power supply 66a. This supply provides the voltage waveforms to the driving resonator 1 as instructed by the microprocessor 67. The voltage waveforms are selected by the microprocessor 67 to create or nullify states of vibratory excitation or alteratively to drive a cantilever to a region of interest and execute only that read/write data transfer. This supply 66a is linked to the microprocessor by a bus 71, as are the other circuit functions within 66.

The next item within group 66 is a positional sensor 66b for determining the physical position of a selected cantilever 7. Shown is a capacitive position sensor 72 adjacent the Nth cantilever 7 and connected to this circuit. Again, this circuitry is connected to the microprocessor 67 via bus 71. Such a capacitor may be implemented by placing electrodes on the cantilever and opposing web walls 25. Alternative means of determining cantilever position via the bit-array itself are discussed below.

The next function within group 66 is plate/cantilever DC/AC voltage bias means 66c. This is essentially the same as an STM sample voltage bias generator. In the DC voltage mode, a potential can be created relative to the tip for purposes of creating and sustaining a tunneling current or an emission current. An ability to superimpose an AC constituent on top of or in place of the DC baseline voltage permits one to determine the conductivity of the bit and therefore use conductivity as a contrast mechanism. This is the same as is practiced for STM wherein different sample features (bits) have characteristic conductivities. Again, bus 71 connects this circuitry to the microprocessor 67.

Also within group 66 is tip-position sensing circuitry 66d. This may also consist of a passive capacitive sensing means 73, similar to that shown for cantilever #N or may consist of active circuitry which linearizes and calibrates the microactuator displacements for a desired driving voltage range. It may utilize the tip current measured at unwritten bit array track and sector reference locations to do so. Again, bus connection 71 to the microprocessor 67 is provided.

The next circuit within group 66 is tip DC/AC voltage bias means 66e. This provides a function similar to that of the plate/cantilever DC/AC supply 66c. In the case of a plate 7' or 7" rather than a cantilever 7, there are multiple tips per plate, and this gives the freedom to operate under different gap voltages from different tips even though the mating bit arrays are on the same plate at the same voltage. Again, bus connection 71 to the microprocessor 67 is provided. Thus, both reading to and writing from different tips may simultaneously occur using a plate bit-array.

The next circuit function in group 66 is tip tunneling/emission current circuitry 66f. In the tunneling mode, this circuitry operates similarly to that of the STM in its many modes; for example, in the constant average current mode, this circuitry monitors that current and senses any perturbations caused by bits. Typical currents are on the order of nanoamps and typical voltages on the order of millivolts, as in STM. Such perturbations are amplified and integrated as necessary such that the set point tunneling average current is maintained, yet the perturbations caused by the bits are read as sensed data bits. The emission mode is utilized by providing several tens of electron volts to the tip 27 and causing electron emission at relatively large gaps. In this case, the circuitry keeps track of the emitted electrons being transferred across the relatively large gap. Bit mechanisms and media utilizing both tunneling and emission electrons were described previously. Again, bus connection 71 to the microprocessor 67 is provided.

Finally for group 66 there is shown a tip microactuator high voltage supply 66g. This voltage causes the physical displacement of the tip 27 via its deformable underlying microactuator or microactuator/cantilever. The voltage provided is determined by the setpoint average tunneling current in the most typical mode of use as is widely known for STM.

It is to be emphasized the circuits appearing in group 66 are not necessarily physically adjacent each other in the device. They are grouped in the manner in the schematic because they are all of a service/supply nature and may utilize hard-wired circuits integratable in microelectronic fashion preferably in regions such as 23.

The next major electronic constituent is the switching means 65. Its purpose is to direct the application of previously discussed circuit means 66a-g and the flow of bitstreams to/from selected bit-arrays. Thus, switching means 65 may contain means for switching digital bitstreams as well as analog voltages and currents. Switching means 65 may also be implemented as part of layer 23 and may take direction from the microprocessor 67 or from the multiplexer 70. As an example, the microprocessor 67 may receive an incoming message on bus 68 that it is desired to demultiplex a bitstream into four substreams and store those four streams of data on four adjacent bit-arrays. The multiplexed data then may arrive either on bus 68 to the microprocessor 67 or on bus 69 (which may be the same bus) to the demultiplexer 70 wherein it is separated into four substreams. These four substreams may be saved in a buffer memory in, for example, multiplexer 70, before they are loaded either serially or in parallel through the switching means 65 onto the four bit-arrays. Switching means 65 may be capable of porting data through multiple parallel channels, in which case the application of circuits 66 would be simultaneously made to several subdevices involved in the operation. The switching done by means 65 would be under the direction of microprocessor 67. It is to be noted that the microprocessor 67 may consist of a microcontroller with a fixed set of software or firmware to implement its tasks.

The microprocessor 67 performs the following functions: digital signal processing, bit error detection/correction, vibration compensation, formatting/erasing-/initializing, memory management, tip/array positional synchronization, cantilever trajectory calculation, filtering, and overall system control. All of these functions may utilize a programmed microprocessor or microcontroller for their execution as algorithms in software or firmware.

In STM, digital signal processing is extensively utilized to maximize the signal-to-noise ratio as well as to apply a variety of waveform shaping, filtering, transformation, linearization and calibration functions. In this memory device, it may also be utilized to act to counter interference from the operation of adjacent tips simultaneously. Bit error detection and correction is a standard need for any mass memory. In addition, encryption may also be provided.

Vibration compensation has been previously discussed and implementation of the appropriate nullifying vibrations are herein calculated and implemented. For severe shocks to the device, this circuitry may retract the active tips and divert data to the buffer memory within multiplexer 70 until the shock has passed.

The formatting, erasing and initialization functions are akin to those found on hard disk drives. An algorithm is provided in the microprocessor 67 to run an erasure program as well as to create delineated areas on the bit-arrays similar in nature to the sectors and tracks found on disks for purposes of the tip being able to recognize its position in the bit-array.

Memory management functions include any routine housecleaning algorithms provided for purposes of power management and data packing efficiency as provided in hard disk products.

Tip/array synchronization algorithms may be incorporated in microprocessor 67 to support tip/array synchronization circuitry included in group 66 (not shown). This serves to time the operations of the tip relative to the moving cantilever(s) such that the correct data is being read and written from the correct location(s). The cantilever or plate tracks and sectors, possibly written by the tip itself, are employed to do this. Alternatively, the cantilever positional sensors may be used. This also times the driving of the gap dimensions via the tip microactuators in proper timing with the scanning of the cantilevers to maintain a constant average gap or to withdraw the tip when not in use.

Filters may be employed as well as additional coders and decoders (not shown) for purposes of preparing incoming and outgoing bitstreams for optimal processing and addressed transmission into and out of the device. Filter algorithms may be executed by the digital signal processor in the microprocessor 67.

Block 70 depicts a multiplexer/demultiplexer especially useful for the vastly increased I/O bitrate made possible by dumping data to/from multiple subdevices simultaneously. Such attempts are currently being made by ganging disk drives into arrays.

It is to be noted that a bus 71 connects all of the discussed electronic constituents for bidirectional passage of data and instructions for application of the servicing means 66 by switching means 65 amongst the multitude of subdevices. Cantilevers 7, 7', 7" and mating tip means 27 would generally be provided in two-dimensional arrays or even three-dimensional arrays, although only a one-dimensional array is shown in FIG. 6 for simplicity. Only the connections to subdevice #N are shown in FIG. 6, and it is to be understood that on the subdevice side of the switching means 65, interconnections exist for each and every subdevice which can be connected by switching means 65. Thus, means 65 may also incorporate row and column coders and decoders if they are not already provided in circuit group 66, microprocessor 67, or multiplexer/demultiplexer 70. For reading and writing simultaneously to multiple subdevices, the electronic functions 66a-g would be arranged to each have the capability to simultaneously serve a number of subdevices.

However, it is preferred to minimize the complexity of the device so a choice must be made to minimize the number of subdevices simultaneously connected via switching means 65 to the electronic services 66a-g. Not all functions have to be switched. As an example of this, the tip bias or the cantilever bias may be applied to all of the tips 27 or cantilevers 7, 7', 7" simultaneously, while only the tips being used to read or write are driven by their microactuators to tunneling proximity with their adjacent arrays. It will be recalled that in one variation of the microactuation means of FIGS. 4A and 4B, the tip 27 is implemented directly on the insulated beam 47 and the beam (microactuator in that case) is moved by deformation caused by beam stresses induced by differential thermal expansion or differential bimorph piezo-expansion. The point here is that even switching of high voltages can be avoided and this device can still be implemented. Both differential thermal expansion, of an implanted resistive layer 42, for example, caused by resistive heating due to a current flow and the bending of a piezo bimorph can be achieved with low voltages. New tradeoffs arise, however, due to thermal relaxation time constants and inertial effects, respectively.

The inventor has described what in actuality amounts to a generic memory device capable of incorporating the benefits of many existing and future potential media means. Unlike optical and magnetic memories, one is not restricted to bit sizes on the order of a fraction of a micrometer as is also the case for digital integrated circuit memory which utilizes lithographically size-limited storage cells. The key advantages of the ultra-tiny bit and massive number of redundant and possible parallel subdevices solves the problem of gross mass-memory crashes and limited bitstream flow rates. Other key advantages are the vast increase in bits per unit volume and read/write access and latency times compared to rotating devices. The best features of solid state electronics, micromechanical devices and rotating memory devices are blended with the ability of tunneling tips implemented in a rigid structure to read and write features scalable to the atomic or individual electronic-state level.

It is expected that rotating media can be supplanted by microvibratory media and that microvibratory media will remain ahead of digital integrated circuit (DRAM) memory in density indefinitely because of the generic advantage that the bits herein do not need to be separated by interconnections as with a DRAM.

INDUSTRIAL APPLICABILITY

The memory device of the invention is expected to find use as the next generation of mass-storage device, supplanting rotating memories of both the magneto-optical and magnetic variety.

REFERENCES

1) "Scanning Tunneling Microscopy", *Journal of Applied Physics*, Vol. 61(2), pp. R1-R23 (Jan 15, 1987);

2) "Vacuum Tunneling: A New Technique for Microscopy", *Physics Today*, pp. 26-33 (Aug 1986);

3) "Imaging with Scanning Tunneling Microscopy", *Photonics Spectra*, pp. 135-136 (Mar 1989);

4) "Scanning Tunneling Microscopy in Research and Development", *Research & Development*, pp. 125-129 (Feb 1989);

5) "Scanning Tunneling Microscopy and Atomic Force Microscopy: Application to Biology and Technology", *Science*, Vol. 242, pp. 209-216 (Oct 14, 1988);

6) "Investigation of Silicon in Air with a Fast Scanning Tunneling Microscope", *Journal of Vacuum Science and Technology*, Vol. A 6(2), pp. 408-411 (Mar/Apr 1988);

7) "The Piezo Book", Publication No. "Piezo 330-288/51683-0" of Burleigh Instruments, Inc.;

8) "A Small World Grows Tinier", *Newsweek*, p. 65 (Nov. 30, 1987);

9) "Surface Micromachining for Microsensors and Microatuators", *Journal of Vacuum Science and Technology*, Vol. B 6(6), pp. 1809-1813 (Nov/Dec 1988);

10) "The Design and Performance of PVDF Transducers", *IEEE 1987 Ultrasonics Symposium*, pp. 675-9;

11) "Spinned P(VDF-TrFE) Copolymer Layer for a Silicon-Piezoelectric Integrated US Transducer", *IEEE 1987 Ultrasonics Symposium*, pp. 667-70;

12) "The Comeback of the Vacuum Tube: Will Semiconductor Versions Supplement Transistors?", *Semiconductor International*, pp. 15-18 (Aug 1988);

13) "Memory I.C. Built with Ferroelectrics", *Semiconductor International*, p. 20 (May 1988);

14) "A New Memory Technology Is About to Hit the Market", *Electronics*, pp. 91-94 (Feb 18, 1988); and "Krysalis Puts Data Directly in Ferroelectric Cells", *Electronics*, pp. 94-95 (Feb 18, 1988);

15) "Coaxial Thin-Film Transducers Based on PZT", *IEEE 1989 Ultrasonics Symposium*, pp. 1-5;

16) "Advances in Structure and Fabrication Process for Thin Film Acoustic Resonator", *IEEE 1987 Ultrasonics Symposium*, pp. 385-393;

17) "New Air-Gap Type Piezoelectric Composite Thin-Film Resonators", *IEEE 1987 Ultrasonics Symposium*, pp. 415-418;

18) "Surface Modification in the Nanometer Range by the Scanning Tunneling Microscope", *Journal of Vacuum Science & Technology*, Vol. A 6(2), pp. 537-539 (Mar/Apr 1988);

19) "Direct Deposition of 10-nm Metallic Features with the Scanning Tunneling Microscope", *Journal of Vacuum Science & Technology*, Vol. B 6(6), pp. 1877-1880 (Nov/Dec 1988);

20) "High-Resolution Deposition and Etching of Metals with a Scanning Electrochemical Microscope", *Journal of Vacuum Science & Technology*, Vol. B 6(6), pp. 1873-1876 (Nov/Dec 1988);

21) "Microstructure and Electrical Conductivity of Plasma Deposited Gold/Fluorocarbon Composite Films", *Journal of Vacuum Science & Technology*, Vol. A 4(1), pp. 46-51 (Jan/Feb 1986);

22) "Application of the Scanning Tunneling Microscope to Insulating Surfaces", *Journal of Vacuum Science & Technology*, Vol. A 6(2), pp. 448-453 (Mar/Apr 1988);

23) "Data Processing for Scanning Tunneling Microscopy", *Journal of Vacuum Science & Technology*, Vol. A 6(2), pp. 393-397 (Mar/Apr 1988);

24) "Scanning Tunneling Spectroscopy of Oxygen Adsorbates on the GaAs(110) Surface", *Journal of Vacuum Science & Technology*, Vol. B 6(4), pp. 1472-1478 Jul/Aug 1988);

25) "Summary Abstract: Dipalmitoylphosphatidylcholine-Langmuir-Blodgett Films on Various Substrates [Si(111), Au, Sn] Studied by Scanning Tunneling Microscopy", *Journal of Vacuum Science & Technology*, Vol. A 6(2), pp. 358-359 (Mar/Apr 1988);

26) "Scanning Tunneling Microscopy of Silver, Gold, and Aluminum Monomers and Small Clusters on Graphite", *Journal of Vacuum Science & Technology*, Vol. A 6(2), pp. 419-423 (Mar/Apr 1988);

27) "Startup Gives Silicon Nitride New Life", *Electronic Engineering Times*, (Apr 3, 1989);

28) "Ballistic Electron Emission Microscopy and Spectroscopy of Au/GaAs Interfaces", *Journal of Vacuum Science & Technology*, Vol. B 7(4), pp. 945-949 (Jul/Aug 1989);

29) "Ferroelectric Memories", *ESD: The Electronic System Design Magazine*, pp. 29, 30, 32, 35 (Aug 1988); and 30) "Tunneling Microscopy of Steps on Vicinal Ge(001) and Si(001) Surfaces", *Journal of Vacuum Science & Technology*, Vol. A 6(2), pp. 493-496 (Mar/Apr 1988).

What is claimed is:

1. A memory device comprising:
   (a) at least one member having at least one surface connected to a support means and at least one surface movable by controlled distortion means, said at least one movable surface movable relative to a disposed opposite plane;
   (b) a plurality of read/write tips;
   (c) a plurality of bit-arrays;
   (d) with said read/write tips disposed either on said movable surface or on said opposite plane and said bit-arrays disposed on the other so as to provide motion of said tips relative to said bit-arrays, each of said read/write tips and said bit-arrays separated by a gap;
   (e) housing means for hermetically sealing groups comprising at least one of said movable members, at least one of said read/write tips, and at least one of said bitarrays from other such groups and from the external environment;
   (f) said means of controlled structural distortion of said at least one movable member permitting physical addressing by each said read/write tip of its mating bits in its mating bit-array;
   (g) means for electrically addressing each read/write tip and its mating bit-array for routing incoming bit-streams to at least one of said bit-arrays or for sensing bit-streams being read from at least one of said bit-arrays through at least one of said read/write tips; and
   (h) means for coarse presetting, fine-controlling, and monitoring said gap between said mating tips and bit-arrays via movement of said tip toward or away from its mating bit-array.

2. The memory device of claim 1 wherein said controlled structural distortion means comprises an electrically deformable material selected from the group consisting of piezoelectric, ferroelectric, and electrostrictive materials, mechanically coupled either directly or indirectly to said at least one movable member having said at least one movable surface.

3. The memory device of claim 2 wherein said electrically deformable material is selected from the group consisting of α-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations.

4. The memory device of claim 1 comprising a plurality of movable members comprising flexurally distortable cantilevers attached to said support means.

5. The memory device of claim 1 wherein said at least one movable member comprises a non-distorting plate attached to said support means by means of flexurally distortable springs having their compliance in a direction parallel to the plane of said plate.

6. The memory device of claim 1 wherein said at least one movable member comprises a material selected from the group consisting of glasses, ceramics, oxides, semiconductors, layered transition metal dichalcogenides, graphite, silicon, α-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations.

7. The memory device of claim 1 wherein said at least one movable member is electrically extendable for controllably changing said bit-array gap, said electrical extendability supplementing or supplanting said tip movement toward or away from said mating bit array, said extendability motion being independent of said physical addressing distortion.

8. The memory device of claim 1 wherein each said read/write tip is disposed on at least one microactuator stack consisting of an electrically deformable tip support pad having top and bottom surfaces, said pad comprising at least one layer of electrostrictive or piezoelectric material, electrodes on said top and bottom surfaces, a dielectric layer on said electrode on said top surface, and said tip disposed on said dielectric layer, with an interconnection from said tip to said electrical addressing means.

9. The memory device of claim 8 wherein said electrode on said bottom surface disposed beneath each tip support pad is commonly connected.

10. The memory device of claim 8 wherein said tip comprises an electrically conductive material selected from the group consisting of tungsten, tungsten-rhenium alloy, platinum, platinum-iridium alloy, doped silicon, refractory metals, and conductive ceramics.

11. The memory device of claim 10 wherein said tip is provided with a conductive coating thereon comprising a material selected from the group consisting of nickel, gold, platinum, iridium, rhodium, tungsten, and rhenium.

12. The memory device of claim 8 wherein said read/write tip gap fine controlling microactuation means comprises independently distortable pads of piezoelectric or electrostrictive material selected from the group consisting of α-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations, upon which said tip is disposed.

13. The memory device of claim 8 wherein said coarse gap presetting means comprises independently distortable pads of piezoelectric or electrostrictive material selected from the group consisting of α-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations, on which said microactuator stack is placed.

14. The memory device of claim 8 comprising dual microactuators for each read/write tip, with one microactuator providing fine motion and a second microactuator providing coarse motion.

15. The memory device of claim 1 wherein said read/write tip gap fine controlling means comprises independently distortable supports of plate-like diaphragm or cantilever structures on which said tips are placed, said means achieving buckling or bending distortion toward or away from the opposed bit-arrays via external inducement of compressive or tensile stresses in said plate-like diaphragm or cantilever.

16. The memory device of claim 15 wherein said buckling or bending distortion is achieved by the electrical distortion of a piezoelectric or electrostrictive film disposed on said diaphragm.

17. The memory device of claim 15 wherein said buckling or bending distortion is achieved by means capable of creating thermal gradients and thus differential expansion distortion stresses in said diaphragm or by means of uniform heating of said diaphragm relative to its surrounding support structure.

18. The memory device of claim 15 wherein said buckling or bending distortion is achieved by Coulomb attractive or repulsive forces created between said diaphragm and an adjacent support structure.

19. The memory device of claim 15 wherein said buckling or bending distortion also provides coarse motion.

20. The memory device of claim 15 wherein said plate-like diaphragm or cantilever structure acts as one electrode of a plate capacitor to permit capacitive measurement of said distortion.

21. The memory device of claim 1 wherein each said read/write tip comprises fine microactuation means consisting of at least one microactuator stack consisting of an electrically deformable tip support pad having top and bottom surfaces, said pad comprising at least one layer of electrostrictive or piezoelectric material, electrodes on said top and bottom surfaces, a dielectric layer on said electrode on said top surface, and said tip disposed on said dielectric layer, with an interconnection from said tip to said electrical addressing means, and wherein said read/write tip gap fine microactuation means are disposed on independently distortable supports of plate-like diaphragm or cantilever structures, said structures achieving buckling or flexural bending distortion toward or away from the opposed bit-arrays via external inducement of compressive or tensile stresses in said plate-like diaphragm or cantilever, thereby also affording coarse gap adjustment.

22. The memory device of claim 21 wherein said coarse presetting is permanently locked in by solidified low melting point material.

23. The memory device of claim 22 wherein said low melting point material is selected from the group consisting of reflowable glasses, solders, and thermally flowable materials.

24. The memory device of claim 21 wherein said buckling or bending distortion means is locked in place at least during use.

25. The memory device of claim 24 wherein said locking is achieved by electrical clamping of electrically driven piezoelectric, electrostrictive, or thermal inducement means and wherein said buckling or bending distortion locking may be released for movement to a large gap OFF state and wherein the locked position is monitored with the aid of the capacitor of claim 20.

26. The memory device of claim 1 wherein a bit media layer, capable of having bits written therein or erased therefrom, is provided on said surface of each said movable member opposite said read/write tips.

27. The memory device of claim 26 comprising write-only tips, wherein said bit media layer is capable of having bits written therein only.

28. The memory device of claim 26 wherein said bit media layer comprises a material deformable by the influence of an adjacent tip, said deformations providing topographical bit contrast.

29. The memory device of claim 28 wherein said material is deformed by the influence of the passing tip current and the heat it generates.

30. The memory device of claim 28 wherein said material is deformed by mechanical contact with said tip.

31. The memory device of claim 26 wherein said bit media layer comprises an electrically polarizable or electrically chargeable material and wherein said tips cause said polarization or charging, said polarization or charging providing electronic or topographical bit contrast by the presence or absence of charged, uncharged, polarized, or unpolarized regions.

32. The memory device of claim 26 wherein said bit media layer comprises a material whose crystalline structure can be reversibly switched via tip-induced heating and electric fields, said switched regions providing electronic or topographic contrast.

33. The memory device of claim 26 wherein said bit media layer comprises a substrate film selected from the group consisting of gold, platinum, graphite, silicon dioxide, noble metals and alloys thereof, and polymeric electret materials, and wherein an atmosphere of adsorbable or absorbable and desorbable gas or vapor is provided around said bit-arrays which is capable of being selectively adsorbed or absorbed and desorbed by said substrate film under the electrical, thermal, or mechanical influence of said mating tip, said adsorbent, absorbent, or lack thereof providing electrical or topographical bit contrast.

34. The memory device of claim 1 wherein said controlled distortion means provides continuous multicycle vibrating motion of at least one movable member, said at least one movable surface of said distorting member moving at or near the fundamental resonant frequency of said distortable member or a harmonic thereof, thereby providing linear or areal relative scanning motion of constant maximum amplitude between at least one tip and one data-bit array.

35. The memory device of claim 34 wherein said driving distortion means is periodically driven when the scanningmotion free-vibration amplitude decays to a minimum predetermined value.

36. The memory device of claim 1 wherein said controlled distortion means provides single-shaped impulses which serve to drive at least one movable member directly to a physical position relative to its mating tip where at least one data bit in the bit-array can be written to or read to or from a predetermined location.

37. The memory device of claim 36 including means for providing viscous damping of said moving member.

38. Memory apparatus comprising at least one memory device of claim 1 and including electrical control means comprising:
(a) multiplexer/demultiplexer and buffer memory means for parallel processing of incoming/outgoing data from or to a plurality of said groups substantially simultaneously;
(b) ancillary circuit means for providing voltages and currents needed to sustain operation of said tips as well as for providing output voltages or currents which give information regarding the geometric and temporal relationship of the tip/array pairs;
(c) bus means for passing data and instructions amongst various of said electrical control means;
(d) switching means for selective application of said ancillary services and data bus means to/from the correct bit-arrays and read/write tips; and
(e) microprocessor means for coordinating the operation of said ancillary circuit means, the switching of those functions and incoming/outgoing data to/from desired subdevices, checking of data integrity, synchronization and memory housekeeping functions, and digital signal processing or the direction thereof, along with the negation of undesirable external vibrations.

39. The apparatus of claim 38 wherein said microprocessor means includes at least one of the capabilities of digital signal processing, bit error detection and correction, vibration compensation, memory array housekeeping functions, startup/shutdown sequences, redundancy management, including formatting, erasing, and initializing, memory management, positional synchronization of a read/write tip with respect to its bit-array, movable member trajectory calculations for continuous harmonic vibration wherein data is read or written as the appropriate bit locations pass said tip or for single event deflections wherein said movable member is pulsed directly to a region of interest, noise filtering, and bus control.

40. A memory device comprising:
(a) at least one member having at least one surface connected to a support means and at least one surface movable by controlled distortion means, said movable surface disposed opposite a stationary plane;
(b) a plurality of read/write tips disposed on said stationary plane;
(c) a plurality of bit-arrays disposed on said movable ends, thereby providing motion of said tips relative to said bit-arrays, each of said read/write tips and said bit-arrays separated by a gap;
(d) housing means for hermetically sealing groups comprising at least one of said members, at least one of said read/write tips, and at least one of said bit-arrays from other such groups and from the external environment;
(e) said means of controlled structural distortion of said at least one movable member permitting physical addressing by each said read/write tip of its mating bits in its mating bit-array;
(f) means for electrically addressing each read/write tip and its mating bit-array for routing incoming bit-streams to at least one of said bit-arrays or for sensing bit-streams being read from at least one of said bitarrays through at least one of said read/write tips; and
(g) means for coarse presetting, fine-controlling, and monitoring said gap between said mating tips and bit-arrays via movement of said tip toward or away from its mating bit-array.

41. The memory device of claim 40 wherein said controlled structural distortion means comprises an electrically deformable piezoelectric, ferroelectric, or electrostrictive material, mechanically coupled either directly or indirectly to said at least one movable surface.

42. The memory device of claim 41 wherein said electrically deformable material is selected from the group consisting of $\alpha$-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations.

43. The memory device of claim 40 comprising a plurality of movable members comprising flexurally distortable cantilevers attached to said support means on one end, the free end supporting said bit-array and facing its mating tip.

44. The memory device of claim 40 wherein said at least one movable member comprises a material selected from the group consisting of glasses, ceramics, oxides, semiconductors, layered transition metal dichalcogenides, graphite, silicon, $\alpha$-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations.

45. The memory device of claim 40 wherein each said read/write tip is disposed on at least one microactuator stack consisting of an electrically deformable tip support pad having top and bottom surfaces, said pad comprising an electrostrictive or piezoelectric material, electrodes on said top and bottom surfaces, a dielectric layer on said electrode on said top surface, and said tip disposed on said dielectric layer, with an interconnection from said tip to said electrical addressing means.

46. The memory device of claim 45 wherein said electrode on said bottom surface disposed beneath each tip support pad is commonly connected.

47. The memory device of claim 45 wherein said tip comprises an electrically conductive material selected from the group consisting of tungsten, tungsten-rhenium alloy, platinum, platinum-iridium alloy, doped silicon, refractory metals, and conductive ceramics.

48. The memory device of claim 47 wherein said tip is provided with a conductive coating thereon comprising a material selected from the group consisting of nickel, gold, platinum, iridium, rhodium, tungsten, and rhenium.

49. The memory device of claim 45 wherein said read/write tip gap fine controlling microactuation means comprises independently distortable pads of piezoelectric or electrostrictive material selected from the group consisting of $\alpha$-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations, on which said tip is placed.

50. The memory device of claim 45 wherein said coarse gap presetting means comprises independently distortable pads of piezoelectric or electrostrictive material selected from the group consisting of $\alpha$-quartz, lithium sulfate monohydrate, lead zirconate titanate, lead titanate, lead meta-niobate, polyvinylidene fluoride, copolymers of vinylidene fluoride and trifluoroethylene, barium titanate, cadmium sulfide, zinc oxide, cadmium selenide, aluminum nitride, beryllium oxide, silica, lithium niobate, lithium tantalate, para-tellurite, bismuth germanium oxide, gallium arsenide, doped silicon, ammonium dihydrogen phosphate, ferroelectric materials having a gadolinium-molybdate $\beta'$ structure, and materials having the formula $ABO_3$, where A and B are cations, on which said microactuator stack is placed.

51. The memory device of claim 45 comprising dual microactuators for each read/write tip, with one microactuator providing fine motion and a second microactuator providing coarse motion.

52. The memory device of claim 40 wherein said read/-write tip gap fine controlling means comprises independently distortable supports of plate-like diaphragm or cantilever structures on which said tips are placed, said means achieving buckling or bending distortion toward or away from the opposed bit-arrays via external inducement of compressive or tensile stresses in said plate-like diaphragm or cantilever.

53. The memory device of claim 52 wherein said buckling or bending distortion is achieved by the electrical distortion of a piezoelectric or electrostrictive film disposed on said diaphragm.

54. The memory device of claim 52 wherein said buckling or bending distortion is achieved by means capable of creating thermal gradients and thus differential expansion distortion stresses in said diaphragm or by means of uniform heating of said diaphragm relative to its surrounding support structure.

55. The memory device of claim 52 wherein said buckling or bending distortion is achieved by Coulomb attractive or repulsive forces created between said diaphragm and an adjacent support structure.

56. The memory device of claim 52 wherein said buckling or bending distortion also provides coarse motion.

57. The memory device of claim 52 wherein said plate-like diaphragm or cantilever acts as one electrode of a plate capacitor to permit capacitive measurement of said distortion or deflection.

58. The memory device of claim 40 wherein each said read/write tip comprises fine microactuation means consisting of at least one microactuator stack consisting of an electrically deformable tip support pad having top and bottom surfaces, said pad comprising at least one layer of electrostrictive or piezoelectric material, electrodes on said top and bottom surfaces, a dielectric layer on said electrode on said top surface, and said tip disposed on said dielectric layer, with an interconnection from said tip to said electrical addressing means, and wherein said read/write tip gap fine microactuation means are disposed on independently distortable supports of plate-like diaphragm or cantilever structures, said structures achieving buckling or flexural bending distortion toward or away from the opposed bit-arrays via external inducement of compressive or tensile stresses in said plate-like diaphragm or cantilever, thereby also affording coarse gap adjustment.

59. The memory device of claim 58 wherein said coarse presetting is permanently locked in by solidified low melting point material.

60. The memory device of claim 59 wherein said low melting point material is selected from the group consisting of reflowable glasses, solders, and thermally flowable materials.

61. The memory device of claim 58 wherein said buckling or bending distortion means is locked in place at least during use.

62. The memory device of claim 61 wherein said locking is achieved by electrical clamping of electrically driven piezoelectric, electrostrictive, or thermal inducement means and wherein said buckling or bending distortion locking may be released for movement to a large gap OFF state and wherein the locked position is monitored with the aid of the capacitor of claim 57.

63. The memory device of claim 40 wherein a bit media layer, capable of having bits written therein or erased therefrom, is provided on said surface of each said movable member opposite said read/write tips.

64. The memory device of claim 63 comprising write-only tips, wherein said bit media layer is capable of having bits written therein only.

65. The memory device of claim 63 wherein said bit media layer comprises a material deformable by the influence of an adjacent tip, said deformations providing topographical bit contrast.

66. The memory device of claim 65 wherein said material is deformed by the influence of the passing tip current and the heat it generates.

67. The memory device of claim 65 wherein said material is deformed by mechanical contact with said tip.

68. The memory device of claim 63 wherein said bit media layer comprises an electrically polarizable or electrically chargeable material and wherein said tips cause said polarization or charging, said polarization or charging providing electronic or topographical bit contrast by the presence or absence of charged, uncharged, polarized, or unpolarized regions.

69. The memory device of claim 63 wherein said bit media layer comprises a material whose crystalline structure can be reversibly switched via tip-induced heating and electric fields, said switched regions providing electronic or topographic contrast.

70. The memory device of claim 63 wherein said bit media layer comprises a substrate film selected from the group consisting of gold, platinum, graphite, silicon dioxide, noble metals and alloys thereof, and polymeric electret materials, and wherein an atmosphere of adsorbable or absorbable and desorbable gas or vapor is provided around said bit-arrays which is capable of being selectively adsorbed or absorbed and desorbed by said substrate film under the electrical, thermal, or mechanical influence of said mating tip, said adsorbent, absorbent, or lack thereof providing electrical or topographical bit contrast.

71. The memory device of claim 40 wherein said controlled distortion means provides continuous multi-cycle vibrating motion of at least one movable member, said at least one movable surface of said distorting member moving at or near the fundamental resonant frequency of said distortion member or a harmonic thereof, thereby providing linear or areal relative scanning motion of constant maximum amplitude between at least one tip and one data-bit array.

72. The memory device of claim 71 wherein said driving distortion means is periodically driven when the scanningmotion free-vibration amplitude decays to a minimum predetermined value.

73. The memory device of claim 40 wherein said controlled distortion means provides single-shaped impulses which serve to drive at least one movable member directly to a physical position relative to its mating tip where at least one data bit in the bit-array can be written to or read to or from a predetermined location.

74. The memory device of claim 73 including means for providing viscous damping of said moving member.

75. Memory apparatus comprising at least one memory device of claim 40 and including electrical control means comprising:
 (a) multiplexer/demultiplexer and buffer memory means for parallel processing of incoming/outgoing data from or to a plurality of said groups substantially simultaneously;
 (b) ancillary circuit means for providing voltages and currents needed to sustain operation of said tips as well as for providing output voltages or currents which give information regarding the geometric and temporal relationship of the tip/array pairs;
 (c) bus means for passing data and instructions amongst various of said electrical control means;

(d) switching means for selective application of said ancillary services and data bus means to/from the correct bit-arrays and read/write tips; and (e) microprocessor means for coordinating the operation of said ancillary circuit means, the switching of those functions and incoming/outgoing data to/from desired subdevices, checking of data integrity, synchronization and memory housekeeping functions, and digital signal processing or the direction thereof, along with the negation of undesirable external vibrations.

76. The apparatus of claim 75 wherein said microprocessor means includes the capability of digital signal processing, bit error detection and correction, vibration compensation, memory array housekeeping functions, startup/-shutdown sequences, redundancy management, including formatting, erasing, and initializing, memory management, positional synchronization of a read/write tip with respect to its bit-array, movable member trajectory calculations for continuous harmonic vibration wherein data is read or written as the appropriate bit locations pass said tip or for single event deflections wherein said movable member is pulsed directly to a region of interest, noise filtering, and bus control.

77. A memory device comprising:
(a) a plurality of single crystal silicon movable members comprising flexurally distortable cantilevers attached to a support means on one end, the free end movable by controlled distortion means, said movable end disposed opposite a stationary plane;
(b) a plurality of read/write tips disposed on said stationary plane;
(c) a bit media layer provided on said movable surface of each said movable member capable of having bits written therein or erased therefrom to support a plurality of bit-arrays disposed on said movable ends, thereby providing motion of said tips relative to said bit-arrays, each of said read/write tips and said bit-arrays separated by a gap;
(d) housing means for hermetically sealing groups comprising at least one of said members, at least one of said read/write tips, and at least one of said bit-arrays from other such groups and from the external environment;
(e) said means of controlled structural distortion of said at least one movable member permitting physical addressing by each said read/write tip of its mating bits in its mating bit-array;
(f) means for electrically addressing each read/-write tip and its mating bit-array for routing incoming bit-streams to at least one of said bit-arrays or for sensing bit-streams being read from at least one of said bit-arrays through at least one of said read/-write tips; and
(g) means for coarse presetting, fine-controlling, and monitoring said gap between said mating tips and bit-arrays via movement of said tip toward or away from its mating bit-array.

78. The memory device of claim 77 wherein each said read/write tip is disposed on at least one microactuator stack consisting of an electrically deformable tip support pad having top and bottom surfaces, said pad comprising an electrostrictive or piezoelectric material, electrodes on said top and bottom surfaces, a dielectric layer on said electrode on said top surface, and said tip disposed on said dielectric layer, with an interconnection from said tip to said electrical addressing means.

79. The memory device of claim 78 wherein said electrode on said bottom surface disposed beneath each tip support pad is commonly connected.

80. The memory device of claim 78 wherein said tip comprises an electrically conductive material selected from the group consisting of tungsten and doped silicon.

81. The memory device of claim 80 wherein said tip is provided with a conductive coating thereon comprising a material selected from the group consisting of nickel, gold, platinum, iridium, rhodium, tungsten, and rhenium.

82. The memory device of claim 77 wherein said read/-write tip gap fine controlling means comprises independently distortable supports of plate-like diaphragm structures on which said tips are placed, said means achieving buckling distortion toward or away from the opposed bit-arrays via external inducement of compressive or tensile stresses in said plate-like diaphragm.

83. The memory device of claim 82 wherein said buckling distortion is achieved by the electrical distortion of a piezoelectric or electrostrictive film disposed on said diaphragm.

84. The memory device of claim 82 wherein said buckling distortion is achieved by means capable of creating thermal gradients and thus differential expansion distortion stresses in said diaphragm or by means of uniform heating of said diaphragm relative to its surrounding support structure.

85. The memory device of claim 82 wherein said buckling distortion is achieved by Coulomb attractive or repulsive forces created between said diaphragm and an adjacent support structure.

86. The memory device of claim 82 wherein said buckling distortion also provides coarse motion.

87. The memory device of claim 82 wherein said platelike diaphragm acts as one electrode of a plate capacitor to permit capacitive measurement of said distortion or deflection.

88. The memory device of claim 77 wherein each said read/write tip comprises fine microactuation means consisting of at least one microactuator stack consisting of an electrically deformable tip support pad having top and bottom surfaces, said pad comprising at least one layer of electrostrictive or piezoelectric material, electrodes on said top and bottom surfaces, a dielectric layer on said electrode on said top surface, and said tip disposed on said dielectric layer, with an interconnection from said tip to said electrical addressing means, and wherein said read/write tip gap fine microactuation means are disposed on independently distortable supports of plate-like diaphragm structures, said structures achieving buckling distortion toward or away from the opposed bit-arrays via external inducement of compressive or tensile stresses in said plate-like diaphragm, thereby also affording coarse gap adjustment.

89. The memory device of claim 77 wherein said bit media layer comprises a material deformable by the influence of an adjacent tip, said deformations providing topographical bit contrast.

90. The memory device of claim 89 wherein said material is deformed by the influence of the passing tip current and the heat it generates.

91. The memory device of claim 89 wherein said material is deformed by mechanical contact with said tip.

92. The memory device of claim 77 wherein said bit media layer comprises an electrically polarizable or electrically chargeable material and wherein said tips cause said polarization or charging, said polarization or charging providing electronic or topographical bit contrast by the presence or absence of charged, uncharged, polarized, or unpolarized regions.

93. The memory device of claim 77 wherein said bit media layer comprises a material whose crystalline structure can be reversibly switched via tip-induced heating and electric fields, said switched regions providing electronic or topographic contrast.

94. The memory device of claim 77 wherein said bit media layer comprises a substrate film selected from the group consisting of gold, platinum, graphite, silicon dioxide, noble metals and alloys thereof, and polymeric electret materials, and wherein an atmosphere of adsorbable or absorbable and desorbable gas or vapor is provided around said bit-arrays which is capable of being selectively adsorbed or absorbed and desorbed by said substrate film under the electrical, thermal, or mechanical influence of said mating tip, said adsorbent, absorbent, or lack thereof providing electrical or topographical bit contrast.

95. The memory device of claim 77 wherein said controlled distortion means provides continuous multi-cycle vibrating motion of at least one movable member, said at least one movable surface of said distorting member moving at or near the fundamental resonant frequency of said distortion member or a harmonic thereof, thereby providing linear or areal relative scanning motion of constant maximum amplitude between at least one tip and one data-bit aray.

96. The memory device of claim 95 wherein said driving distortion means is periodically driven when the scanningmotion free-vibration amplitude decays to a minimum predetermined value.

97. The memory device of claim 77 wherein said controlled distortion means provides single-shaped impulses which serve to drive at least one movable member directly to a physical position relative to its mating tip where at least one data bit in the bit-array can be written to or read to or from a predetermined location.

98. The memory device of claim 97 including means for providing viscous damping of said moving member.

99. Memory apparatus comprising at least one memory device of claim 77 and including electrical control means comprising:
 (a) multiplexer/demultiplexer and buffer memory means for parallel processing of incoming/outgoing data from or to a plurality of said groups substantially simultaneously,
 (b) ancillary circuit means for providing voltages and currents needed to sustain operation of said tips as well as for providing output voltages or currents which give information regarding the geometric and temporal relationship of the tip/array pairs,
 (c) bus means for passing data and instructions amongst various of said electrical control means,
 (d) switching means for selective application of said ancillary services and data bus means to/from the correct bit-arrays and read/write tips, and
 (e) microprocessor means for coordinating the operation of said ancillary circuit means, the switching of those functions and incoming/outgoing data to/from desired subdevices, checking of data integrity, synchronization and memory housekeeping functions, and digital signal processing or the direction thereof, along with the negation of undesirable external vibrations.

100. The apparatus of claim 99 wherein said microprocessor means includes the capability of digital signal processing, bit error detection and correction, vibration compensation, memory array housekeeping functions, startup/shutdown sequences, redundancy management, including formatting, erasing, and initializing, memory management, positional synchronization of a read/write tip with respect to its bit-array, movable member trajectory calculations for continuous harmonic vibration wherein data is read or written as the appropriate bit locations pass said tip or for single event deflections wherein said movable member is pulsed directly to a region of interest, noise filtering, and bus control.

* * * * *